US011554881B2

(12) United States Patent
Yen et al.

(10) Patent No.: US 11,554,881 B2
(45) Date of Patent: Jan. 17, 2023

(54) ATTITUDE DETERMINATION AND CONTROL SYSTEM AND METHOD THEREOF

(71) Applicant: TENSOR TECH CO., LTD, Taipei (TW)

(72) Inventors: Po-Hsun Yen, Chiayi (TW); Shang-Jung Lee, Chiayi (TW); Yung-Cheng Chang, Chiayi (TW); Sung-Liang Hou, Chiayi (TW)

(73) Assignee: TENSOR TECH CO., LTD., Taipei (TW)

(*) Notice: Subject to any disclaimer, the term of this patent is extended or adjusted under 35 U.S.C. 154(b) by 0 days.

(21) Appl. No.: 17/545,766

(22) Filed: Dec. 8, 2021

(65) Prior Publication Data
US 2022/0388693 A1 Dec. 8, 2022

(30) Foreign Application Priority Data

May 26, 2021 (TW) .................................. 110119095

(51) Int. Cl.
*B64G 1/24* (2006.01)
*B64G 1/36* (2006.01)

(52) U.S. Cl.
CPC .............. *B64G 1/244* (2019.05); *B64G 1/36* (2013.01); *B64G 2001/245* (2013.01)

(58) Field of Classification Search
CPC ........................ B64G 1/244; B64G 2001/245
See application file for complete search history.

(56) References Cited

U.S. PATENT DOCUMENTS

| | | | | |
|---|---|---|---|---|
| 6,285,927 B1* | 9/2001 | Li | ............................ | B64G 1/36 |
| | | | | 701/13 |
| 7,246,775 B1* | 7/2007 | Goodzeit | ............... | B64G 1/244 |
| | | | | 244/164 |
| 9,038,958 B1* | 5/2015 | Ross | ..................... | B64G 1/286 |
| | | | | 701/13 |
| 9,475,592 B2* | 10/2016 | Stagmer | ............... | H02K 41/031 |
| 2013/0125667 A1* | 5/2013 | Fitz-Coy | .................. | G01L 3/00 |
| | | | | 73/862.041 |
| 2020/0255165 A1* | 8/2020 | Abbasi | ................... | B64G 1/244 |

\* cited by examiner

*Primary Examiner* — Richard R. Green
*Assistant Examiner* — William L Gmoser
(74) *Attorney, Agent, or Firm* — Millen, White, Zelano & Branigan, P.C.; William Nixon; Wan-Ching Montfort

(57) ABSTRACT

This patent presents an attitude determination and control system based on a Quaternion Kalman Filter (QKF) with an extendable number of sensors and actuators. Furthermore, it is compatible with the spherical motor as its attitude actuator. The system includes a processor with a QKF, at least one direct attitude actuator, and at least two environmental sensors. Firstly, system dynamics calculates a first propagation attitude determination result. Next, update the first propagation with the attitude sensor measurements. Then, control the satellite's attitude via the attitude actuator closer to the attitude command provided by the user. The proposed system dynamic model could adjust the number of actuators and sensors freely without reprogramming the algorithms for new missions with new configurations on the actuators and sensors. Moreover, if some components fail, the algorithm can automatically remove those related sequences to avoid the overall failure of the system.

18 Claims, 16 Drawing Sheets

ATTITUDE DETERMINATION AND CONTROL SYSTEM AND METHOD THEREOF

CROSS-REFERENCE TO RELATED PATENT APPLICATION

This application claims the benefit under 35 USC §119 of Taiwan Patent Application No. 110119095 filed on May 26, 2021, which is incorporated herein by reference in its entirety.

FIELD OF THE DISCLOSURE

The present disclosure relates to an attitude determination and control system using a Quaternion Kalman Filter(QKF). It is more particularly to a satellite attitude control system compatible with a spherical motor as its attitude actuator. Moreover, the number of environmental sensors and the number of attitude actuators are expandable.

BACKGROUND

Satellites usually equip with payloads having pointing requirements, for instance, antennas, solar cells, or cameras. In general, these payloads are "fixed" on a satellite and cannot move or rotate by themselves. Therefore, they are only allowed to have linear or rotational movements together with the satellite. For example, to point the antennas at a specific ground receiving station, the satellite has to perform an attitude compensation procedure which includes the following steps: (1) determining the attitude of the satellite and (2) adjusting the attitude of the satellite closer to the commanded attitude using actuators. Here in this document, "Attitude" refers to the rotational relationship between an inertial reference frame and the reference frame adhered to the satellite. Moreover, they usually are expressed in the form of quaternions.

The inertial reference frame may be an Earth-Centered, Inertial (abbreviated as "ECI") coordinate frame or an Earth-Centered, Earth-Fixed (abbreviated as "ECEF") coordinate frame which is represented by the Cartesian coordinate system, the cylindrical coordinate system, the spherical coordinate system, or the like. For example, a Cartesian coordinate system can be defined by a given origin, an X-axis unit vector, and another Y-axis unit vector that is orthogonal to the X-axis unit vector. Finally, the right-hand rule determines the Z-axis unit vector.

The following two methods may be applied to obtain the attitude: (1) using an attitude measurement device or (2) using algorithms to perform calculations according to an environmental referencing object in the space like the sun or earth magnetic field.

The attitude can be directly obtained by using the attitude measurement device. The attitude measurement device, for example, may be a star tracker.

The attitude can also be obtained by using algorithms to perform calculations according to the environmental referencing objects measured by environmental sensors. These environmental sensors, for example, may be sun sensors and magnetometers. The environmental reference objects may be the sunlight or the earth's magnetic field.

The angular momentum stored in the angular momentum exchange device (such as a reaction wheel or a control moment gyro, namely the indirect attitude actuator) inside the satellite has to be known as an input of the attitude determination and control algorithms. In other words, angular momentum stored in the satellite makes a difference in the power or the torque needed for a satellite to change its attitude. For example, in two conditions that 1) an angular momentum exchange device of the satellite is functioning and storing a certain amount of angular momentum (hereinafter referred to as "$1^{st}$ condition") and 2) an angular momentum exchange device of the satellite is in the IDLE mode without storing any angular momentum (hereinafter referred to as "$2^{nd}$ condition"). The satellites require different torque to attend to the commanded attitude even the initial attitude is the same. Such angular momentum stored has to be checked by rotational speed sensors in the angular momentum exchange device.

The conventional integrated satellite attitude determination and control system (ADCS) has several written attitude determination modes. However, each mode has an unchangeable number and type of 1) environmental sensors, 2) the attitude measurement unit, and 3) the inertia measurement unit. If the sensors designated by the mission requirement varied, the supplier must reprogram the attitude determination algorithm accordingly.

Moreover, sensors may fail after a period of operation. If the system still solves for the attitude using the same algorithm, the system may face malfunctions. To keep the robustness of a system, an expandable algorithm with the capability to accommodate a different number of sensors is a solution for prolonging a satellite's lifespan.

Consequently, the conventional attitude control system can't be expandable to have several environmental sensors. On the one hand, they can't add or remove the inertia measurement unit (such as a gyroscope) or the attitude measurement unit (such as a star tracker) from the determination algorithm flexibly. On the other hand, they also fail to add or remove different kinds of direct attitude actuators, indirect attitude actuators, or combinations thereof from the system. As a result, the attitude determination algorithm has to be reprogrammed every time after the attitude measurement units, the direct attitude actuators and the indirect attitude actuators configuration is designated according to the client's requirements and budgets. Therefore, this traditional-style causes more delivery time of the system and the inconvenience of the client. Furthermore, upon the satellite runs along the earth orbit, some of the sensors fail subsequently, the algorithm can't be updated automatically, thereby causing a wrong determination of the satellite's attitude.

SUMMARY

In response to the above-referenced inadequacies, the object of the present disclosure is to provide an attitude control system based on a Quaternion Kalman Filter (QKF) and the method thereof. The attitude control system mainly performs a calculation "according to the information of at least two 'different' environmental reference objects within the space measured by at least two environmental sensors" to achieve more accurate attitude determination and attitude control for the satellite. Moreover, the present disclosure provides an algorithm applied by the attitude control system, and the algorithm includes an attitude control and determination method. The process of performing a calculation "according to the information of at least two different environmental reference objects within the space measured by at least two environmental sensors" includes at least one "propagate procedure," and at least one "update procedure" to correct the propagation result. The propagate procedure hereinafter is abbreviated as the "propagate stage," on the other hand, the update procedure hereinafter is abbreviated as the "update stage." The attitude control method requires the attitude determination result for proceeding. Compared with the attitude determination method, the attitude control method at least further includes a "control procedure," The control procedure hereinafter is abbreviated as the "control stage."

The attitude determination algorithm includes one "propagate procedure," and at least one "update procedure." There is more than one kind of propagation method (namely, obtaining a first propagation result). The present disclosure provides six of them. However, the present disclosure should not be limited to these six propagation methods. As long as the propagation methods are modified with the spirit of the present disclosure, they shall be encompassed by the scope of this present disclosure. According to different propagation methods, the attitude control system may have different elements or combinations of elements. For example, when the propagation method requires the inertia information, the attitude control system may further include an inertia measurement unit. So does the attitude information obtained by the inertia measurement unit. The inertia measurement unit maybe, but is not limited to, a gyroscope, and the attitude measurement unit maybe, but is not limited to, a star tracker.

In one embodiment of the present disclosure, an attitude control system based on a QKF for controlling an attitude of a satellite is provided. The system includes a controller, an attitude actuator, a $1^{st}$ to $N^{th}$ environmental sensor, and a processor. The controller receives an attitude command from a user to generate a torque-input command. The attitude actuator is for outputting a torque according to a torque-control command to change the satellite's attitude. A torque sensor can obtain a measured output torque from the attitude actuator. The $1^{st}$ to the $N^{th}$ environmental sensor measures a $1^{st}$ to $M^{th}$ target to obtain a $1^{st}$ to $N^{th}$ measured value of environmental sensor (measured value). N could be any positive integer, and M is a positive integer less than or equal to N. The processor has a QKF, and the processor connects to the controller, the attitude actuator, and the $1^{st}$ to the $N^{th}$ environmental sensor. The processor obtains a first propagation result by calculating at least one selected from the group consisting of the torque-input command from the controller in the very last time step, and the measured output torque. For obtaining a second propagation result, the $1^{st}$ to the $N^{th}$ measured value is used for updating the first propagation result.

In some embodiments, the attitude control system further includes at least one selected from the group consisting of an inertia measurement unit and an attitude measurement unit in some embodiments. The inertia measurement unit measures the inertia of the satellite to obtain inertia information, and the attitude measurement unit measures the satellite's attitude to obtain attitude information.

In the condition that the satellite attitude control system includes the "inertia measurement unit," the processor is further connected to the inertia measurement unit, and the processor is for obtaining the first propagation result by performing a calculation according to at least one selected from the group consisting of "the torque-input command from the controller in the very last time step and the measured output torque," and according to the "inertia information."

Moreover, in the condition that the attitude control system includes the "attitude measurement unit," the processor is further connected to the attitude measurement unit, and the processor is for obtaining the first propagation result by performing a calculation according to at least one selected from the group consisting of "the torque-input command from the controller in the very last time step and the measured output torque," and according to the "attitude information."

In the foregoing embodiments, the attitude control system may include at least one selected from the group consisting of the "attitude measurement unit" and "the inertia measurement unit". After the processor obtains the first propagation result, the processor further obtains the second propagation result by calculating the $1^{st}$ to the $N^{th}$ measured value and the first propagation result.

In another embodiment of the present disclosure, an attitude determination method based on a QKF for determining an attitude of a satellite is provided. The method includes a propagate stage and an update stage. The propagate stage includes receiving an attitude command from a user and obtaining a first propagation result by using a processor having a QKF to perform a calculation according to at least one selected from the group consisting of the torque-input command from the controller in the very last time step and a measured output torque. The update stage includes using a $1^{st}$ to $N^{th}$ environmental sensor to measure a $1^{st}$ to $M^{th}$ target to obtain a $1^{st}$ to $N^{th}$ measured value, wherein N could be any positive integer. In addition, M is a positive integer less than or equal to N, and the update stage includes obtaining a second propagation result by using the processor to perform a calculation according to the $1^{st}$ to the $N^{th}$ measured value and the first propagation result.

In some embodiments, the propagate stage further includes at least one step selected from the group consisting of "using an inertia measurement unit to measure the inertia of the satellite", and "using an attitude measurement unit to measure the satellite's attitude". In the condition that the propagate stage further includes a step of "using the inertia measurement unit to measure the inertia of the satellite to obtain the inertia information," the processor is for obtaining the first propagation result by performing a calculation according to at least one selected from the group consisting of "the torque-input command from the controller in the very last time step and measured output torque," and the inertia information. In the condition that the propagate stage further includes a step of "using the attitude measurement unit to measure the attitude of the satellite to obtain the attitude information," the processor is for obtaining the first propagation result by performing a calculation according to at least one selected from the group consisting of "the torque-input command from the controller in the very last time step and the measured output torque," and the attitude information.

Another embodiment of the present disclosure provides a procedure that includes attitude determination to control based on a QKF for controlling a satellite's attitude. The method includes a propagate stage, an update stage, and a control stage. The propagate stage includes obtaining a first propagation result by using a processor having a QKF to perform a calculation according to at least one selected from the group consisting of "the torque-input command from the controller in the very last time step," and "output torque measured by a torque sensor". The update stage includes using a $1^{st}$ to $N^{th}$ environmental sensor to measure a $1^{st}$ to $M^{th}$ target to obtain a $1^{st}$ to $N^{th}$ measured value, wherein N could be any positive integers. In addition, M is a positive integer less than or equal to N. This update stage includes obtaining a second propagation result using the processor to perform a calculation according to the $1^{st}$ to the $N^{th}$ measured value and updating the first propagation result. The control stage calculates the torque-control command according to the "attitude command given by the user," and the "second propagation result." This torque-control command is then sent to triggering the attitude actuator for changing the attitude of a satellite.

In some embodiments, the propagate stage further includes at least one step selected from the group consisting of "using an inertia measurement unit to measure an inertia of the satellite to obtain an inertia information" and "using an attitude measurement unit to measure the attitude of the satellite to obtain an attitude information". In the condition that the propagate stage further includes a step of "using the inertia measurement unit to measure the inertia of the satellite to obtain the inertia information," the processor is for obtaining the first propagation result by performing a calculation according to at least one selected from the group consisting of "the torque command from the processor in the very last time step and the measured output torque," and the "inertia information." In the condition that the propagate stage further includes a step of "using the attitude measurement unit to measure the attitude of the satellite to obtain the attitude information," the processor obtains the first propagation result according to at least one selected from the group consisting of "the input-torque command from the controller in the very last time step and the measured output torque," and the "attitude information." In some embodiments, the propagate stage includes "using an inertia measurement unit to measure an inertia of the satellite to obtain an inertia information" and "using an attitude measurement unit to measure the attitude of the satellite to obtain an attitude information". In these conditions that the propagate stage includes a step of "using the inertia measurement unit to measure the inertia of the satellite to obtain the inertia information" and "using an attitude measurement unit to measure the attitude of the satellite to obtain an attitude information", the processor is for obtaining the first propagation result by performing a calculation according to the "input-torque command from the controller in the very last time step," the "measured output torque," the "inertia information," and the "attitude information".

In some embodiments, the attitude actuator is a direct attitude actuator.

In some embodiments, the attitude actuator further includes at least one direct attitude actuator and at least one indirect attitude actuator.

The indirect attitude actuator could be a spherical motor, and the controller of the control system has at least three control modes: a de-tumbling mode, a de-saturation mode, and a fine pointing mode.

BRIEF DESCRIPTION OF THE DRAWINGS

The present disclosure will become more fully understood from the following detailed description and accompanying drawings.

DETAILED DESCRIPTION

Figure 1:
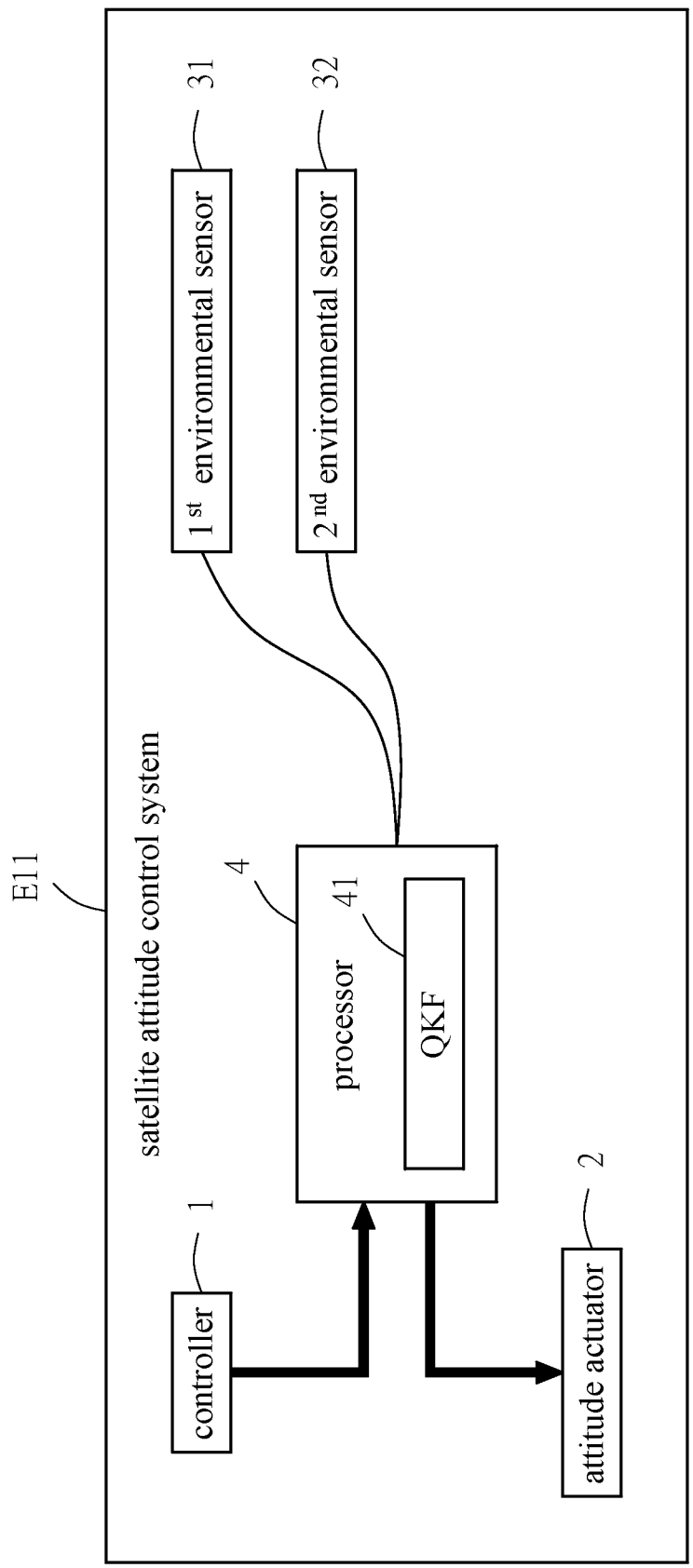
FIG. 1 illustrates a schematic view of a satellite attitude control system E11 according to an embodiment of the present disclosure.

In the following paragraphs, embodiments are provided for describing the implementations of the satellite attitude control system according to the present disclosure, and the same elements are indicated by the same or similar reference numbers.

It should be noted that the directional indications (such as front, rear, left, right, above, under, clockwise, counterclockwise, etc.) in the embodiments are only used to describe the relative positions or movements, etc. of multiple components under specific circumstances (such as those shown in the drawings). When the circumstances are changed, the directional indications may be changed accordingly.

Descriptions for the embodiments are accompanied by drawings incorporated as parts of the specification for describing the embodiments of the present disclosure, but the present disclosure is not limited to the embodiments. Moreover, the following embodiments may be appropriately modified or integrated to achieve another embodiment.

In the following paragraphs, the terms "one embodiment," "one practical embodiment," "a preferred embodiment," "the other embodiment," "another embodiment," or any descriptions which are related to the "embodiment" or the "implementation" are provided for describing the feature, the structure, or the property that may be included in the described embodiment; it should be noted that other embodiments do not necessarily include the feature, the structure, or the property. Moreover, using the terms "in this embodiment," "in some embodiments," or the like does not limit the described embodiments to be the same embodiment. It may refer to different embodiments.

The conventional QKF cannot adjust its number of environmental sensors and actuators without reprogramming its software or firmware.

According to the present disclosure, a technical feature is applying the QKF on the attitude control system. It could be applied on a satellite, an underwater vehicle, a drone, etc. Detail operations of the QKF may be referred to D. Choukroun, L. Y. Bar-Itzhack, and Y. Oshman. (2005) Novel Quaternion Kalman Filter. Published on IEEE Transactions on Aerospace and Electronic Systems Vol.42, No.1 (abbreviated as "Reference 1"). In the present disclosure, the algorithm built in the satellite attitude control system is improved, thereby completing the system's architecture being expandable to have several environmental sensors. The Kalman filter is a high-efficiency recursive filter (autoregressive filter). The Kalman filter uses a series of measurements containing random errors or system errors, produces estimates of the state of a dynamic system. Moreover, specifically, in one or some embodiments, the algorithm built in the satellite attitude control system includes three parts: initialize (hereinafter, "Part A"), propagate (hereinafter, "Part B"), and update (hereinafter, "Part C").

In the Kalman filter model, supposed that the true state at time k is evolved from the state at time k-1 according to the equation $x_k = F_k x_{k-1} + B_k u_k + w_k$, where $F_k$ is the state transition model (/matrix/vector), which is applied to the previous state $x_{k-1}$, $B_k$ is the control-input model which is applied to the control vector $u_k$, and $w_k$ is the process noise.

For the sake of convenience in describing the initial state, the equation is rewritten by taking k=0 as the initial state; namely, it is supposed that the true state at time k+1 is evolved from the state at time k. Therefore, the rewritten equation is $x_{k+1} = F_{k+1} x_k + B_{k+1} u_{k+1} + w_{k+1}$. For the sake of convenience in describing some of the embodiments of the present disclosure, upon applying the Kalman filter to the satellite attitude, the following parameters have to be defined in advance.

(1) "$P_{k/k}$" is the estimation error covariance matrix, and "$P_{0/0}$" is the Initial estimation error covariance matrix;

(2) "$\hat{q}_{k/k}{}^T$" is the attitude quaternion, and "$\hat{q}_{0/0}{}^T$" is the initial attitude quaternion;

(3) "$\hat{\mu}_{k/k}{}^T$" is the drift estimations, and "$\hat{\mu}_{0/0}{}^T$" is the initial drift estimations;

(4) "$\hat{x}_{k/k}{}^T$" is the state space, and "$\hat{x}0/0^T$" is the initial state space.

The calculation processes of Part A, Part B, and Part C are described in order.

[Part A- Initialize]

Firstly, in some embodiments, the relationship between the attitude quaternion (namely, $q_{k/k}$) of the satellite and the time k and the relationship among the state space ($\hat{x}_{k/k}{}^T$) of the satellite, the attitude quaternion ($\hat{q}_{k/k}{}^T$) of the satellite, and the drift estimations ($\hat{\mu}_{k/k}{}^T$) at time k can be presented by following Eq. A-1 and Eq. A-2:

$$q_{k/k}^* = \frac{\hat{q}_{k/k}}{\|\hat{q}_{k/k}\|} \tag{Eq. A-1}$$

$$\hat{x}_{k/k}{}^T = [q_{k/k}{}^T, \hat{\mu}_{k/k}{}^T] \tag{Eq. A-2}$$

In the present disclosure, at least two environmental sensors and a Triad Method are applied to set the initial attitude of the satellite, and the attitude is inputted into the QKF as the state space at time k=0 and the error covariance matrix at time k=0, whose equations are presented as below:

$$q_{0/0}^* = \frac{\hat{q}_{0/0}}{\|\hat{q}_{0/0}\|} \tag{Eq. A-1'}$$

$$\hat{x}_{0/0}{}^T = [q_{0/0}{}^T, \hat{\mu}_{0/0}{}^T] \tag{Eq. A-2''}$$

Next, using Eq. A-1' to set the initial attitude quaternion ($\hat{q}_{0/0}{}^T$) and using Eq. A-2' to set the initial state space ($\hat{x}_{0/0}{}^T$) and then inputting these parameters into the QKF to complete Part A (Initialize).

According to the rewritten equations, in the algorithm of the present disclosure, Part A (Initialize) will be used only in the first iteration (that is, "k=0"). After Part A (Initialize) is completed, several cycles, including Part B (Propagate) and Part C (Update) (hereinafter, "propagate and update cycles"), are performed, according to the command rate (CMD Rate) of the analog-to-digital converters (ADC). Theoretically, the algorithm provided by the present disclosure can support infinite environmental sensors, namely, infinite times of updates (the Part C cycles).

However, it should be noted that, based on the number of the environmental sensors which are installed and participated in the tasks of the satellite attitude control system actually, "one" propagate and update cycle may include one propagate and one update, or one propagate and two updates, or one propagate and three updates, or the like. Specifically, in the case that the satellite attitude control system has N environmental sensors which are installed and participate in the tasks of the satellite attitude control system (where both N and M are integers greater than or equal to 2) actually, then the "one" propagate and update cycle includes one propagate and N updates. Furthermore, the system could adjust the number of actuators and sensors freely without reprogramming the algorithms for new missions with new configurations on the actuators and sensors. Moreover, if some components, such as some sensors, fail, the algorithm can automatically remove those related sequences to avoid the overall failure of the system. Therefore, in the case that there are N environmental sensors in which some of the N environmental sensors are not functioning, the satellite attitude control system will automatically remove the measurements of those non-funcational sensors and only unpdate those sensors which are functioning properly.

[Part B-Propagate]

Before discussing the Part B (Propagate) of the embodiments of the present disclosure, the dynamic equations and the predecessor works of the satellite system of the embodiments of the present disclosure are described in advance. That is, obtaining the satellite angular acceleration ($a_k$) of Eq. B-1 and Eq. B-2; the satellite angular acceleration may be presented by the first derivative of the satellite angular velocity ($\omega_{satellite}{}^{\bullet}$). After the first derivative of the satellite angular velocity ($\omega_{satellite}{}^{\bullet}$) is obtained, the propagate of the Kalman filter is performed.

In the satellite control system, a governing equation is applied to calculate and express the relationship between the angular momentum and the torque. As Eq. B0-1 shows, in this embodiment, the governing equation considers the direct actuator, the indirect actuator, and the disturbance torque. Moreover, it should be noted that Eq. B0-1', Eq. B0-1", and Eq. B0-1 are substantially the same. The shifts of the items are the equations is for the sake of convenience in describing $\dot{H}_{satellite}$ and expressing the conservation law for angular momentum in the embodiments of the present disclosure.

$$\dot{H}_{satellite} + \sum_{a=1}^{j} \dot{H}_{indirect-actuator(a)} = \sum_{b=1}^{k} \tau_{direct-actuator(b)} + \tau_{disturbance} \quad \text{(Eq. B0-1)}$$

$$\dot{H}_{satellite} = \sum_{b=1}^{k} \tau_{direct-actuator(b)} - \sum_{a=1}^{j} \dot{H}_{indirect-actuator(a)} + \tau_{disturbance} \quad \text{(Eq. B0-1')}$$

$$\dot{H}_{satellite} + \sum_{a=1}^{j} \dot{H}_{indirect-actuator(a)} - \sum_{b=1}^{k} \tau_{direct-actuator(b)} - \tau_{disturbance} = 0 \quad \text{(Eq. B0-1'')}$$

Where the parameters in Eq. B0-1 are explained as below:

(1) in Eq. B0-1, H is the angular momentum, τ is the torque, and $\dot{H}$ represents the first-order derivative function by differentiating the angular momentum with time;

(2) in Eq. B0-1, the first item on the right side (namely, $$\sum_{b=1}^{k} \tau_{direct-actuator(b)}$$

represents the torque outputted by the "direct" actuator;

(3) in Eq. B0-1, the second item on the left side, represents the outputted torque of the "indirect" actuator in which the torque output is achieved by manipulating the tilting angle, the rotational speed, and the acceleration/de-acceleration of the rotor;

(4) $\dot{H}_{satellite}$ is the first derivative of the angular momentum with respect to time, as shown in Eq. B0-1', $\dot{H}_{satellite}$ also represents the total torque generated by the direct actuator, the indirect actuator, and the disturbance torque to the satellite;

(5) $\tau_{disturbance}$ represents environmental disturbances that exist in space and exert torques on the satellite. Specifically, $\tau_{disturbance}$ includes the solar radiation pressure torque, the gravity-gradient torque, the magnetic dipole moment torque, the aerodynamic torque, and so forth. However, in most conditions, these disturbances are relatively small compared to the actuators' output torque and cannot be estimated easily. Therefore, according to embodiments of the present disclosure, in the Part B0, the Kalman filter presets the value of the environmental disturbance to be zero (namely, $\tau_{disturbance}$ is set to be 0) for the convenience in the calculation of Eq. B0-6. However, the impacts of these environmental disturbances on the satellite system dynamics are still considered by the QKF in process noise. Hence, the impacts of the environmental disturbances on the satellite system dynamics can be considered in the parameter setting stage of the attitude control system.

Eq. B0-4 and Eq. B0-5 are results develop from some items in Eq. B0-1. The development method may be referred to GEORGE W. HOUSNER, DONALD E. HUDSON. (1991) Applied Mechanics Dynamics (abbreviated as Reference 2), p202-p203, Section 7.8 "The General Equations of Motion for a Rigid Body." In the embodiment of the present disclosure, the model describes the system dynamics of any indirect actuator, including a spherical motor (e.g., a motor disclosed in Taiwan Invention Patent (Patent Number 1719585) "Motor and driving method thereof"), a single-gimbal control moment gyro, a dual-gimbal control moment gyro, a reaction wheel, etc. Moreover, the product of inertia (POI) of the rotor and the satellite itself is fully considered in the system model.

$$H_{satellite} = - \begin{vmatrix} Isat(xx) & -Isat(xy) & -Isat(xz) \\ -Isat(yx) & Isat(yy) & -Isat(yz) \\ -Isat(zx) & -Isat(zy) & Isat(zz) \end{vmatrix} \begin{matrix} \omega_{sat(x)} \\ \omega_{sat(y)} \\ \omega_{sat(z)} \end{matrix} \quad \text{(Eq. B0-2)}$$

$$\dot{H}_{satellite} = I_{satellite} \cdot \dot{\omega}_{satellite} + \omega_{satellite} \times H_{satellite} \quad \text{(Eq. B0-3)}$$

$$H_{indirect-actuator(a)} = I_{rotor(a)} \cdot \omega_{rotor(a)} \quad \text{(Eq. B0-4)}$$

$$\dot{H}_{indirect-actuator(a)} = I_{rotor(a)} \cdot \dot{\omega}_{rotor(a)} + \omega_{rotor(a)} \times H_{rotor(a)} \quad \text{(Eq. B0-5)}$$

In the following embodiments of the present disclosure, the satellite attitude control system can, by measuring, inferring, and calculating, directly or indirectly obtain the rotational speed of the rotor to $\omega_{rotor(a)}$, the angular acceleration of the rotor $\dot{\omega}_{rotor(a)}$, the inertia tensor of the rotor $I_{rotor(a)}$, the angular velocity of the satellite $\omega_{satellite}$, and the inertia tensor of the satellite $I_{satellite}$. Therefore, from the foregoing equations, to $\dot{\omega}_{satellite}$ can be derived as following Eq. B0-6.

$$\dot{\omega}_{satellite} = I_{satellite}^{-1} \cdot \left[ -\omega_{satellite} \times H_{satellite} - \sum_{a=1}^{j} \left( I_{rotor(a)} \cdot \dot{\omega}_{rotor(a)} + \omega_{rotor(a)} \times H_{rotor(a)} \right) + \sum_{b=1}^{k} \tau_{direct-actuator(b)} \right] \quad \text{(Eq. B0-6)}$$

According to Eq. B0-1 to Eq. B0-5, the satellite attitude control system of the embodiment of the present disclosure, is expandable to have any number of direct attitude actuators and indirect actuators freely. Moreover, although the indirect actuators may have several implementations, these indirect actuators are all based on the conservation law of angular momentum, as indicated by Eq. B0-1. Hence, the indirect actuators in different implementations are all suitable for being applied in the satellite attitude control system of the present disclosure.

After the first derivative of the satellite angular velocity with respect to time, to $\dot{\omega}_{satellite}$ is obtained. Then, the propagation procedure of the Kalman filter is performed. The relationships among the delta angle estimation ($\theta_k$), the triaxial angular velocity ($\omega_k$), the angular acceleration ($a_k$), and the change of the time ($\Delta t$) can be presented by following Eq. B-1:

$$\theta_k = \omega_k * \Delta t + 0.5 * a_k * \Delta t^2 \quad \text{(Eq. B-1)}$$

Where the angular acceleration of the satellite at time k ($a_k$) is the result of Eq. B0-6:

$$a_k = \dot{\omega}_{satellite} \quad \text{(Eq. B-2)}$$

Next, with the consideration of the satellite drift, the following Eq. B-3 is used to correct the delta angle estimation $\theta_k$ to obtain the delta angle estimation after drift correction (hereinafter, the "corrected delta angle estimation ($\widetilde{\theta_{k/k}}$)")

$$\widetilde{\theta_{k/k}} = \theta_k - \hat{\mu}_{k/k} * \Delta t \quad \text{(Eq. B-3)}$$

Then, the corrected delta angle estimation ($\widetilde{\theta_{k/k}}$) is introduced into Eq. B-4 to Eq. B-6 for the calculation to obtain a propagated state space at time k+1 ($\hat{x}_{k+1/k}$), the $\hat{x}_{k+1/k}$ is also "the first attitude propagation result" in any of the following embodiments. The "γ" represents the γ function. Detailed contents of the γ function can be referred to page 176 of Reference 1.

$$\hat{q}_{k/k}^- = \gamma(\hat{q}_{k/k}^-) \quad \text{(Eq. B-4)}$$

$$\hat{\varphi}_{k/k}^- = \exp(0.5 * \hat{\theta}_{k/k}^-) \quad \text{(Eq. B-5)}$$

$$\hat{x}_{k+1/k} = \begin{bmatrix} \hat{\varphi}_{k/k}^- & 0 \\ 0 & I \end{bmatrix} * \hat{x}_{k/k} \quad \text{(Eq. B-6)}$$

Then, to correct the error covariance matrix, the aforementioned corrected delta angle estimation ($\hat{\theta}_{k/k}^-$) is introduced into following Eq. B-7 to Eq. B-13 for the calculation to obtain corrected error covariance matrix ($\overline{M_{k/k}^-}$).

$$\hat{\theta}_k^- = \gamma(\hat{\theta}_k^-) \quad \text{(Eq. B-7)}$$

$$\hat{\varphi}_k^- = \exp(0.5 * \hat{\theta}_k^-) \quad \text{(Eq. B-8)}$$

$$\hat{E}_{k/k}^- = E(\hat{q}_{k/k}^-) \quad \text{(Eq. B-9)}$$

$$\hat{\varphi}_k^- = \begin{bmatrix} \hat{\varphi}_k^- & -0.5 * \Delta t * \hat{E}_{k/k}^- \\ 0 & I \end{bmatrix} \quad \text{(Eq. B-10)}$$

$$\hat{M}_{k/k}^- = \hat{q}_{k/k}^- \hat{q}_{k/k}^{-T} + P_{k/k}^q \quad \text{(Eq. B-11)}$$

$$P_k^w = \begin{bmatrix} (\sigma_1^2 + \sigma_2^2 \Delta t) * 0.25 * tr(\hat{M}_{k/k}^-) * I_4 - \hat{M}_{k/k}^- & 0 \\ 0 & \sigma_3^2 * \Delta t * I_3 \end{bmatrix} \quad \text{(Eq. B-12)}$$

$$P_{k+1/k} = \hat{\varphi}_k^- P_{k/k} \hat{\varphi}_k^{-T} + P_k^w \quad \text{(Eq. B-13)}$$

Where $\hat{q}_{k/k}^-$ is obtained from the first four items of the state space $\hat{x}_{k/k}$, and $P_{k/k}^q$ is obtained from the number of the upper-left 4×4 portion of the error covariance matrix $P_{k/k}$. Where $\sigma_1$ is the standard deviation of electronic noise, $\sigma_2$ is the standard deviation of float torque noise, $\sigma_3$ is the standard deviation of the output drift rate, and "E" represents the E function. Detail contents could be found in Reference 1. When the delta angle estimation after drift correction and the error covariance matrix after drift correction is obtained, Part B (Propagate) is completed, and Part C (Update) can then be executed.

[Part C-Update]

After the foregoing Part A (Initialize) and Part B (Propagate) are a executed, the state space $\hat{x}_{x+1/k}+[\overline{q_{k+1/k}^-}^T, \overline{p_{k+1/k}^-}^T]$ and the environment sensing vector pair $[b_{k+1}^i, r_{k-1}^i]$ at time k+1 can be obtained. As mentioned above, the satellite attitude control system has N environmental sensors which are installed and participate in the update stage (where both N and M are integers greater than or equal to 2). "i" here stands for the designated number of the environmental sensor, which is a number ranging from 0 to N (where both N and M are integers greater than or equal to 2). It is understood that "N" not only represents the number of environmental sensors on the satellite but also represents the times of "update" in the algorithm.

In Part C (Update), the characteristics of the quaternion are utilized to obtain an H function, and when the H function multiplies a quaternion which can correctly map $b_{k-1}^i$ to $r_{k-1}^i$, the product of the H function and the quaternion equal 0.

$$s_k^i = 0.5 * (b_{k+1}^i + r_{k+1}^i) \quad \text{(Eq. C-1)}$$

$$d_k^i = 0.5 * (b_{k+1}^i - r_{k+1}^i) \quad \text{(Eq. C-2)}$$

$$H_{k+1}^i = \begin{bmatrix} -s_k^i & d_k^i \\ -d_k^i & 0 \end{bmatrix} \quad \text{(Eq. C-3)}$$

$$\overline{H_{k+1}^i} = \begin{bmatrix} H_{k+1}^i & 0 \end{bmatrix} \quad \text{(Eq. C-4)}$$

Next, the Kalman Gain is calculated by introducing the H function and values at k+1 obtained in Part B (Propagate), which include the state space $\hat{x}_{k+1/k}$, the error covariance matrix $P_{k+1/k}$, the environment sensing vector pair $[b_{k+1}^i, r_{k+1}^i]$ (where $b_{k+1}^i$ is the measured value of the environmental sensor) into following Eq. C-05 to Eq. C-09. Wherein $P_{k+1/k}^q$ is obtained from the number of the upper-left 4×4 portion of the error covariance matrix $P_{k+1/k}$, and the error covariance matrix is defined by the error covariance matrix model for updating the measured value from page 179 of Reference 1: $R_{k+1} = \rho_{k+1}(1_3 - b_{k+1} b_{k-1}^T)$ $$\hat{M}_{k+1/k}^- = \hat{q}_{k+1/k}^- \hat{q}_{k+1/k}^{-T} + P_{k+1/k}^q \quad \text{(Eq. C-5)}$$

$$B_{k+1}^i = \gamma(b_{k+1}^i) \quad \text{(Eq. C-6)}$$

$$P_{k+1}^{\nu-i} = 0.25 * \rho_{k+1}^i * \left[ tr(\hat{M}_{k+1/k}^-) I_4 - \hat{M}_{k+1/k}^- - B_{k+1}^i \hat{M}_{k+1/k}^- B_{k+1}^{iT} \right] \quad \text{(Eq. C-7)}$$

$$S_{k+1/k}^i = H_{k+1}^i P_{k+1/k}^q H_{k+1}^{iT} + P_{k+1}^{\nu-i} \quad \text{(Eq. C-8)}$$

$$K_{k+1}^i = P_{k+1/k} \overline{H_{k+1}^i}^T S_{k+1/k}^{-1} \quad \text{(Eq. C-9)}$$

Lastly, Eq. C-10 and Eq. C-11 are applied to "update" the system state and the error covariance matrix.

$$q_{k+1/k+1}^- = (I_4 - K_{k+1}^i \overline{H_{k+1}^i}) \hat{q}_{k+1/k}^- \quad \text{(Eq. C-10)}$$

$$P_{k+1/k+1} = \quad \text{(Eq. C-11)}$$

$$(I_4 - K_{k+1}^i \overline{H_{k+1}^i}) P_{k+1/k} (I_4 - K_{k+1}^i \overline{H_{k+1}^i})^T + K_{k+1}^i P_{k+1}^{\nu-i} K_{k+1}^{iT}$$

For the sake of convenience in describing embodiments of the present disclosure, correlations between the parameter symbols in the foregoing equations and the terms in the following embodiments are presented as the table below:

| Parameter symbol | Terms in the following embodiments |
|---|---|
| k | A particular time step that the controller received attitude command from the user and commanded the attitude actuator. |
| k + 1 | The time step that follows right after the time step k |
| $\tau_k$ | "Measured output torque" or "torque-control command" |
| $\hat{x}_{k+1/k}$ | First propagation result |
| $b_{k+1}^i$ | The measured value of the environmental sensor |
| N | The satellite attitude control system has N environmental sensors which are installed and participated in the tasks of the satellite attitude control system |
| i | An integer ranging from 0 to N representing the designated number of certain environmental attitude sensors |
| $\widehat{q_{k+1/k+1}}$ | Second propagation result |

In the following paragraphs, practical embodiments of the present disclosure are described.

[First practical embodiment]

Figure 2:
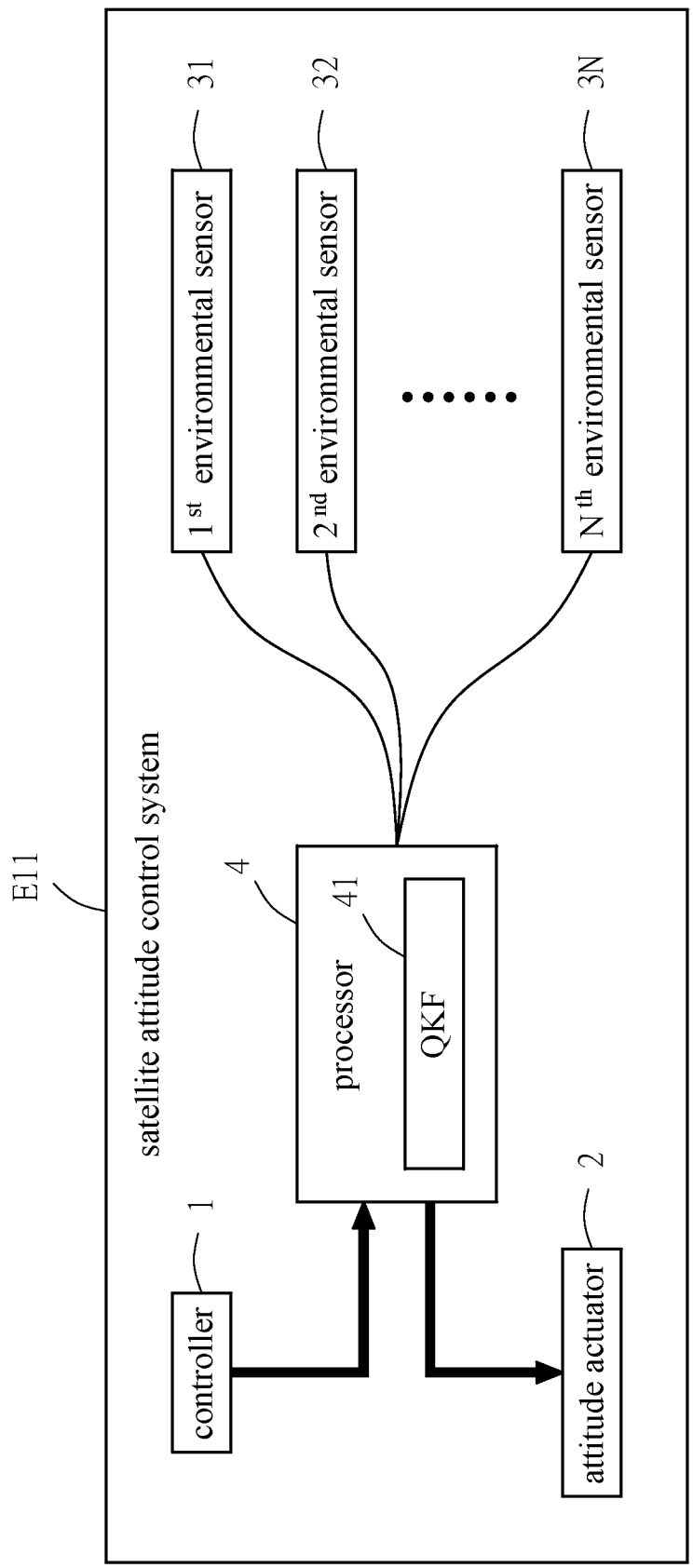
FIG. 2 illustrates a schematic view of a satellite attitude control system E11 according to another embodiment of the present disclosure.

Please refer to FIG. 1 and FIG. 2. They illustrate schematic views of a satellite attitude control system E1 according to a first embodiment of the present disclosure. The satellite attitude control system is operated based on a Quaternion Kalman Filter 41(QKF 41). The satellite attitude control system based on the Quaternion Kalman Filter is provided for controlling an attitude of a satellite. The system includes a controller 1, an attitude actuator 2, a $1^{st}$ to $N^{th}$ environmental sensor, and a processor 4. Controller 1 is for receiving an attitude command of the satellite requested by a user to generate a torque-input command. The attitude actuator 2 is for outputting a torque according to a torque-control command to change the satellite's attitude. The attitude actuator 2 can be measured by a torque sensor to obtain a measured output torque value. The $1^{st}$ to the $N^{th}$ environmental sensor measures a $1^{st}$ t to $M^{th}$ target to obtain a $1^{st}$ to $N^{th}$ measured value. Both N and M are integers greater than or equal to 2, and M is a positive integer less than or equal to N. Processor 4 has a QKF 41, and processor 4 is connected to controller 1, the attitude actuator 2, and the $1^{st}$ to the $N^{th}$ environmental sensor. Processor 4 performs a calculation according to at least one selected from the group consisting of "the torque-input command from the controller in the very last time step and the measured output torque" to obtain a first propagation result. Furtherly, it calculates the second propagation result according to the $1^{st}$ to the $N^{th}$ measured value via updating the first propagation result. Moreover, processor 4 is further for performing a calculation for correction purposes according to the "attitude command," and the "second propagation result" to obtain a torque-control command, and outputting torque to the satellite according to the torque-control command to change the attitude of the satellite by using the attitude actuator 2.

In this embodiment, the satellite could be, but not limited to, a satellite or an underwater vehicle. The satellite attitude control system is applied to a satellite as an illustrative example in the following embodiments. The satellite attitude control system is applied to execute (1) determine the attitude of the satellite at time t, and (2) controlling and adjusting the attitude of the satellite closer to the commanded attitude at time t+1. The attitude command can be represented by quaternions or the like.

As shown in FIG. 1 and FIG. 2, the $1^{st}$ to the $N^{th}$ environmental sensor is the first environmental sensor 31 to the $N^{th}$ environmental sensor 3N. In FIG. 1, N is equal to 2. Hence the satellite attitude control system E11 includes the first environmental sensor 31 and the second environmental sensor 32. In FIG. 2, N is greater than 2. Hence the satellite attitude control system E11 includes the first environmental sensor 31, the second environmental sensor 32, and the $N^{th}$ environmental sensor 3N. FIG. 1 to FIG. 4 illustrates that the satellite attitude control systems E11, E12, E13, according to embodiments of the present disclosure, are expandable to have N environmental sensors.

In this embodiment, to obtain the satellite's attitude, processor 4 calculates at least one input from environmental sensors that obtains measured value in the satellite body reference frame. The ideal measured value for the same environmental referencing object in the inertia frame can further be calculated via ephemeris or any celestial model. By comparing these two pieces of information, a correction for the first propagation result could be made.

As compared with the known arts, it is worth noting that, in the embodiments of the present disclosure, an algorithm capable of performing calculation or data processing to two measured values (e.g., the position of the sun and the position of the earth) obtained by at least sequentially or simultaneously measuring "two 'different' targets with two environmental sensors" is built in the processor 4 of the satellite attitude control system. Therefore, when processor 4 of the satellite attitude control system is connected to two environmental sensors, processor 4 is connected to two different types of environmental sensors (e.g., the sun sensor and the magnetometer) to measure two "different" targets (for example, but not limited to the sun and the earth magnet field).

Here, the calculation for the number of the environmental sensors is neither based on the number of the devices nor based on the maximum number of the environmental sensors that can be disassembled or divided without damage, and it is not calculated based on the types of the environmental sensor. Instead, the number of the environmental sensors is calculated based on the number of the smallest units that can individually and effectively measure the target. For example, the satellite attitude control system, according to embodiments of the present disclosure, may use five sun sensors to measure the position of the sun (the first target) and one earth magnetic sensor to measure the position of the earth (the second target) at the same time.

Here, the number of the environmental sensors is calculated based on the number of different effective measurements of one environmental sensor in the propagate stage S1 and the update stage S2. For example, when one environmental sensor can sequentially or simultaneously perform measurements to the sun and the magnetic field of the earth, since the environmental sensor in the satellite attitude determination method performs effective measurements for the two different targets (the position of the sun and the magnetic field of the earth) sequentially or simultaneously, it is considered that two environmental sensors are applied in this scenario.

Figure 3:
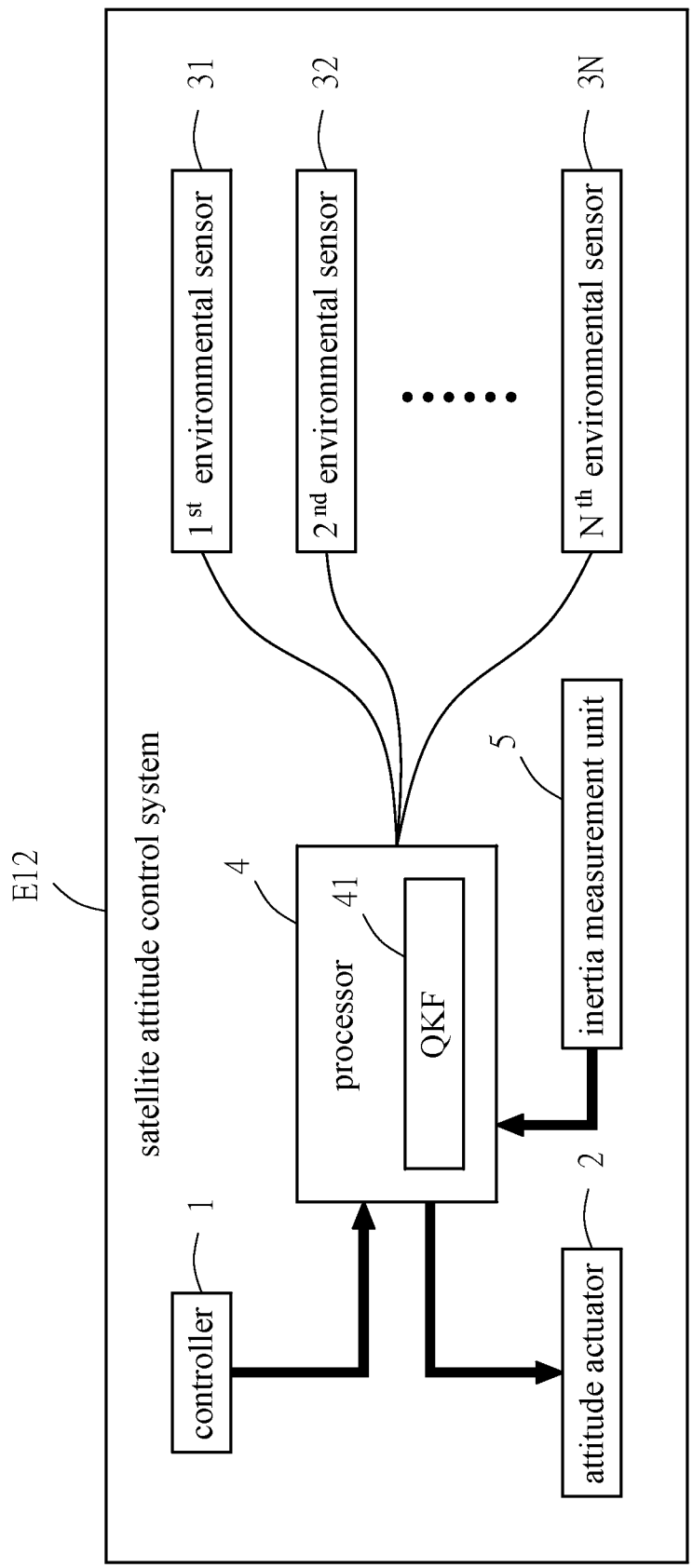
FIG. 3 illustrates a schematic view of a satellite attitude control system E12 according to another embodiment of the present disclosure.

Moreover, as shown in FIG. 3, the satellite attitude control system is expandable to have two or more environmental sensors. The satellite attitude control system can simultaneously connect to N environmental sensors, respectively named the 1st to Nth environmental sensor, which can sequentially or simultaneously measure M "different" targets, respectively named the $1^{st}$ to the $N^{th}$ measured value. For example, the satellite attitude control system uses six environmental sensors; five of the six environmental sensors are sun sensors, the target corresponding to these five environmental sensors should be the sun, the rest one of the six environmental sensors is a magnetometer, and the target corresponding to these environmental sensors should be the earth. Therefore, N equals 6, and m equals 2.

In this embodiment, the satellite attitude control system has at least two functions capable of obtaining a second propagation result, but not limited to. The satellite attitude control system may have the following options: (1) obtaining a first propagation result by performing a calculation according to at least one selected from the group consisting of the torque-input command in the very last time step, and obtaining a second propagation result by performing a calculation according to the $1^{st}$ to the $N^{th}$ measured value and updating the first propagation result; or (2) obtaining a first propagation result by performing a calculation according to the measured value of the torque output, and obtaining a second propagation result by performing a calculation according to the $1^{st}$ to the $N^{th}$ measured value and updating the first propagation result.

In some embodiments, the attitude actuator 2 is a direct attitude actuator 2, for example, a magnetorquer or a thruster.

In some preferred embodiments, the attitude actuator 2 further includes at least one direct attitude actuator and at least one indirect attitude actuator. The indirect attitude actuator may include but not be limited to a spherical motor (e.g., a motor disclosed in Taiwan Invention Patent (Patent Number 1719585) "Motor and driving method thereof"), a single-gimbal control moment gyro, a dual-gimbal control moment gyro, a reaction wheel, etc. From the angular momentum formula "L=Iω", where I is the moment of inertia (unit: kg•m$^2$) and ω is the angular velocity (rad/s), it is understood that the higher rotational speed the indirect attitude actuator 2 has, the higher angular momentum (unit: kgωm$^2$/s, which is represented as "L") the indirect attitude actuator 2 has.

From the torque formula $$\tau = I \cdot \alpha = I\frac{d\omega}{dt}$$

it is understood that to generate the "torque (unit: N•m, which is represented as "τ")" by using a spherical motor, the spherical motor needs to have the "angular acceleration (unit: rad/s$^2$, which is represented as "a ")." However, it should be noted that the spherical motor has limits on the rotational speed, and the spherical motor cannot be accelerated anymore when it hits its maximum rotational speed. As a result, when the motor reaches the rotational speed limit, namely, the limit for storing angular momentum, the spherical motor automatically enters into the De-saturation mode, in which a direct attitude actuator is applied to generate a reverse torque whose direction is opposite to the direction of the torque generated by the indirect attitude actuator while deacceleration. This reverse torque is applied to compensate with the torque produce by the spherical motor while deacceleration, thereby achieving the purpose of the De-saturation for the satellite.

Accordingly, the attitude actuator 2 in the satellite attitude control system can be solely the direct attitude actuator 2 but cannot be the indirect attitude actuator 2.

[Second practical embodiment]

Please refer to FIG. 3. FIG. 3 illustrates a schematic view of a satellite attitude control system E12 according to another embodiment of the present disclosure. In this embodiment, the satellite attitude control system E12 further includes an inertia measurement unit 5. The inertia measurement unit 5 is for measuring the inertia of the satellite to obtain inertia information. In the condition that the satellite attitude control system includes the "inertia measurement unit 5", the processor 4 is further connected to the inertia measurement unit 5. Processor 4 obtains the first propagation result by performing a calculation according to "at least one selected from the group consisting of the torque-input command from the controller in the very last time step" and the measured output torque," and the "inertia information." In other words, processor 4 of the satellite attitude control system E12 obtains the first propagation result by performing a calculation according to the "the torque-input command from the controller in the very last time step," and the "inertia information." Alternatively, processor 4 of the satellite attitude control system E12 obtains the first propagation result by calculating the "measured output torque," and the "inertia information."

[Third practical embodiment]

Figure 4:
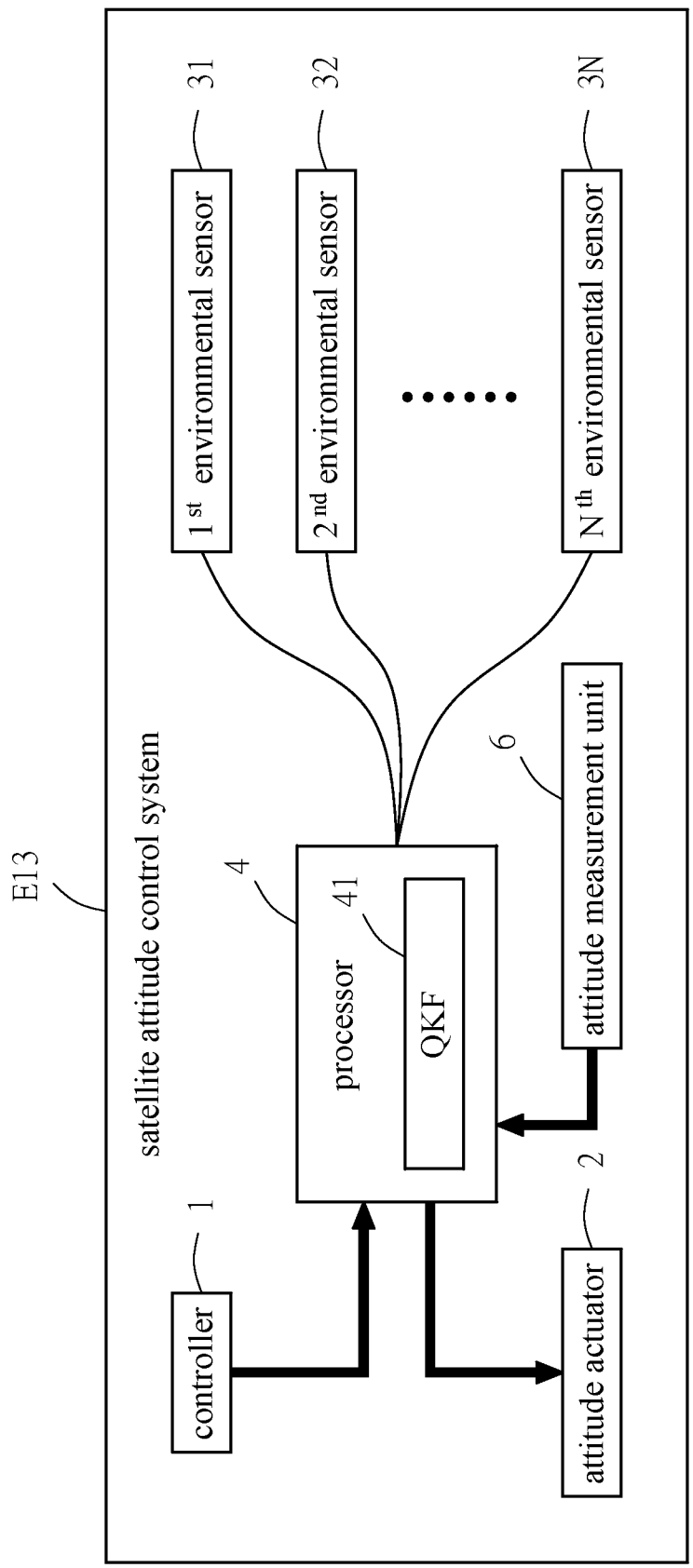
FIG. 4 illustrates a schematic view of a satellite attitude control system E13 according to another embodiment of the present disclosure.

FIG. 4 illustrates a schematic view of a satellite attitude control system E13 according to another embodiment of the present disclosure. In another embodiment, the satellite attitude control system E13 further includes an attitude measurement unit 6. The attitude measurement unit 6 is for measuring the attitude of the satellite to obtain attitude information. In the condition that the satellite attitude control system includes the "attitude measurement unit 6", the processor 4 is further connected to the attitude measurement unit 6. Processor 4 obtains the first propagation result by performing a calculation according to "at least one selected from the group consisting of the torque-input command from the controller in the very last time step and the measured output torque," and the "attitude information." In other words, processor 4 of the satellite attitude control system E13 obtains the first propagation result by performing a calculation according to the "the torque-input command from the controller in the very last time step," and the "attitude information." Alternatively, processor 4 of the satellite attitude control system E13 obtains the first propagation result by performing a calculation according to the "measured output torque," and the "attitude information."

[Satellite attitude determination and control method]

The fourth to the tenth practical embodiments (satellite attitude determination methods E21-E26) as well as the eleventh practical embodiment (satellite attitude control method E31) are provided to elaborate the determination and control method for satellite attitude implemented by the foregoing satellite attitude control system of the embodiment of the present disclosure. Before explaining the fourth to the tenth practical embodiments (satellite attitude determination methods E21-E26) as well as the eleventh practical embodiment (satellite attitude control method E31), the major differences between the practical embodiments are described as below.

First, the following terminologies are defined (please also refer to the foregoing formulas or Eq. A0-1 to Eq. C-11 and related descriptions thereof)

(1) The inertia information maybe, but not limited to the rotational speed of the rotor to $\omega_{rotor(a)}$, the angular acceleration of the rotor $\omega_{rotor(a)}{}^*$, the inertia tensor of the rotor $I_{rotor(a)}$, the angular velocity of the satellite $\omega_{satellite}$, the angular acceleration of the satellite $\omega_{satellite}{}^*$, or the inertia tensor of the satellite $I_{satellite}$.

(2) $\tau_k$ stands for the torque-input command from the controller in the very last time step or the measured output torque. In brief, the torque-input command is a digital signal provided by the user or the calculation of a computer, without measurement, and the measured output torque is done by a sensor.

(3) The attitude information maybe, but is not limited to, the attitude of the satellite.

(4) The first propagation result maybe, but is not limited to $\hat{x}_{k+1/k}$, (5) The second propagation result maybe, but is not limited to, $\widehat{q_{k+1/k+1}}$.

Figure 5:
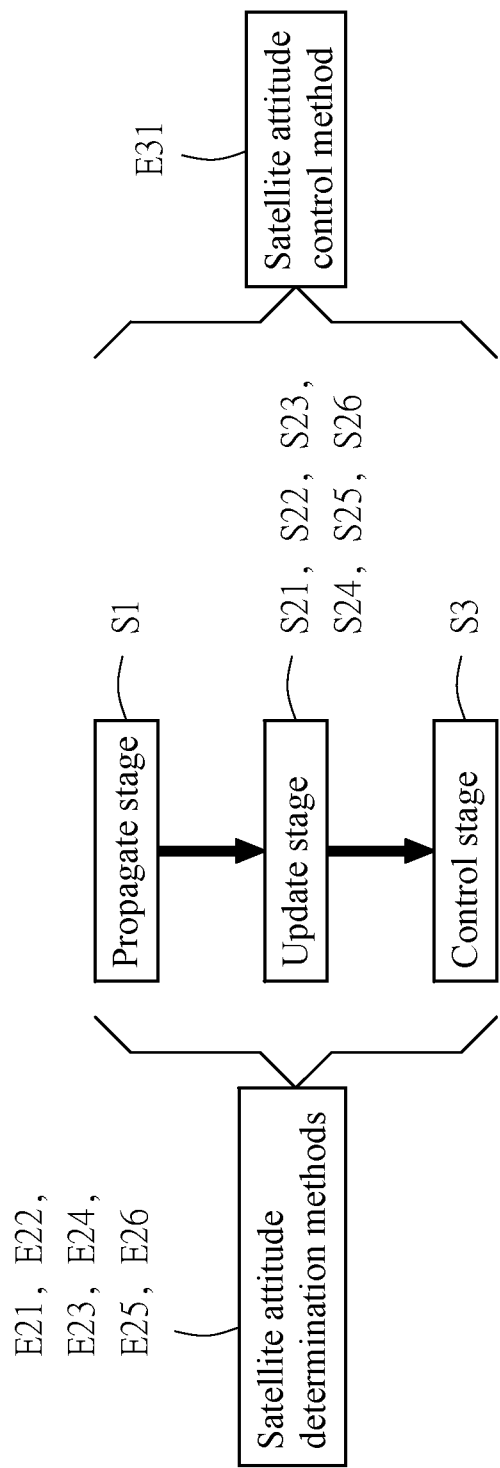
FIG. 5 illustrates a flowchart of satellite attitude determination methods E21-E26 and a satellite attitude control method E31 according to one embodiment of the present disclosure.

FIG. 5 illustrates a flowchart of satellite attitude determination methods E21-E26 according to one embodiment of the present disclosure and a satellite attitude control method E31 according to one embodiment of the present disclosure. It should be noted that as compared with the satellite attitude determination methods E21-E26 according to the present disclosure, the satellite attitude control method E31 according to the present disclosure merely further includes the "control stage S3".

Figure 6:
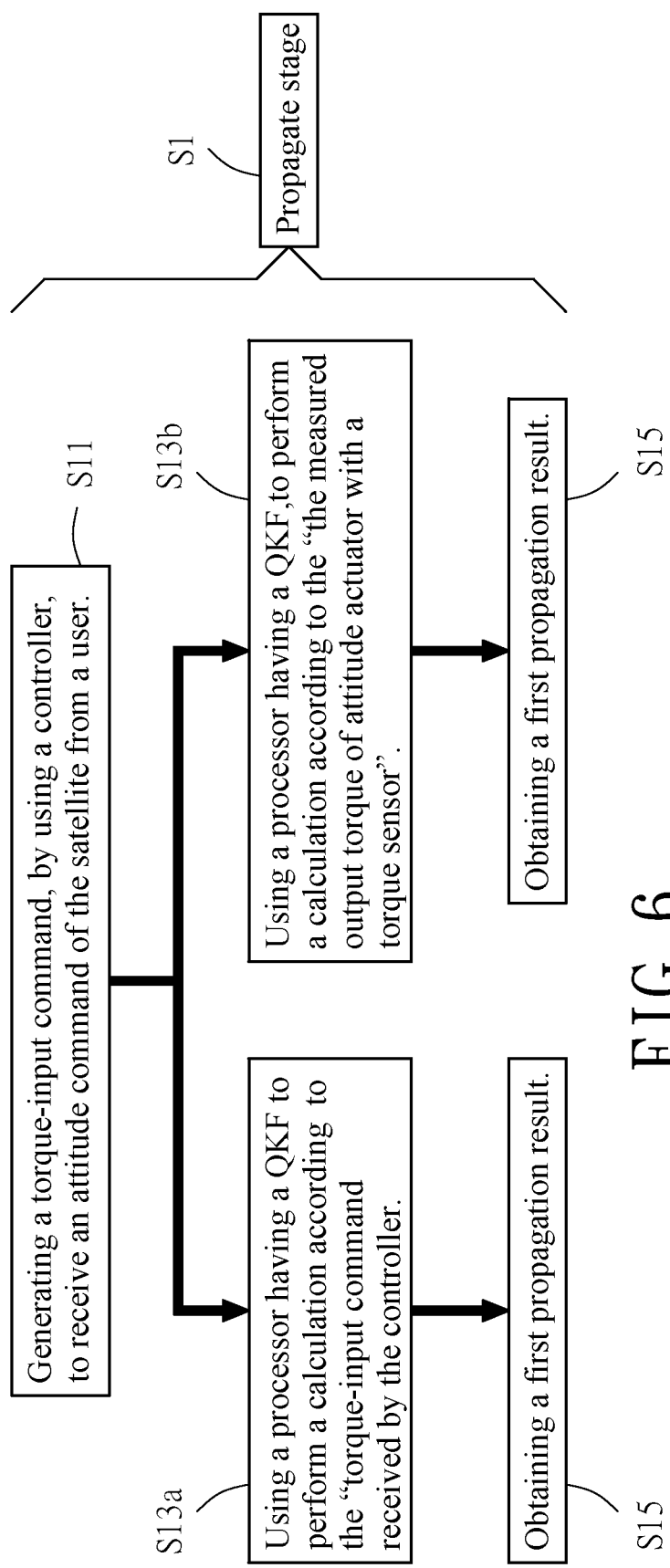
FIG. 6 illustrates a flowchart of a propagate stage in the satellite attitude determination methods E21-E22 according to another embodiment of the present disclosure.
Figure 7:
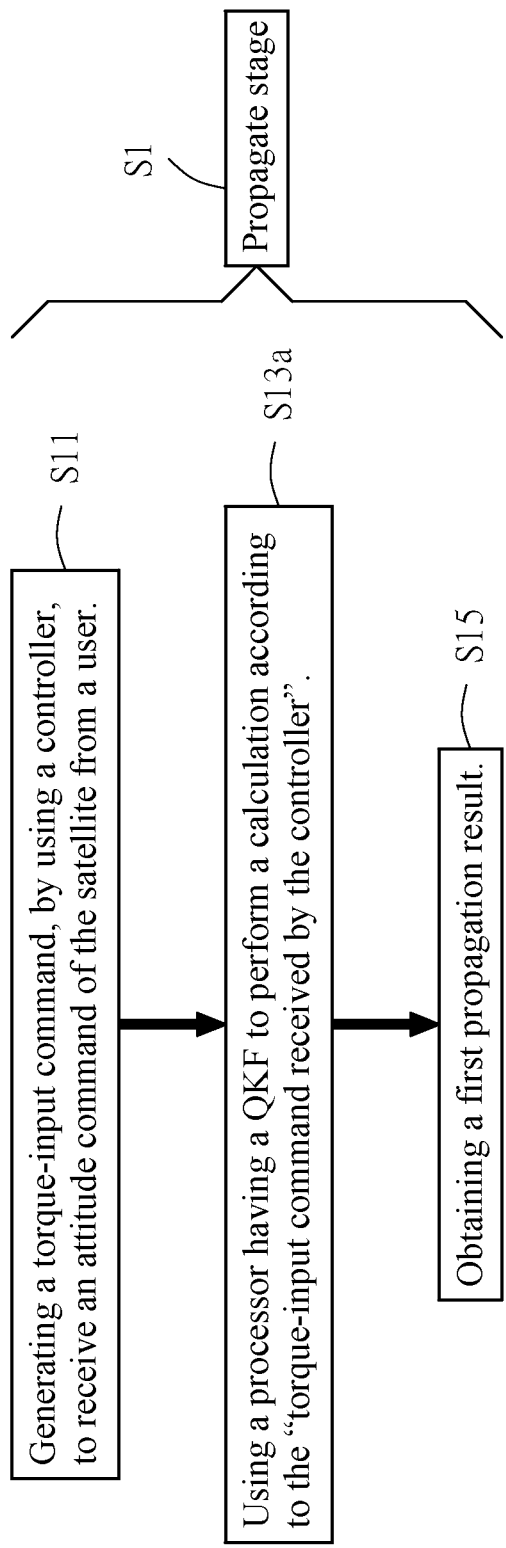
FIG. 7 illustrates a flowchart of the propagate stage in the satellite attitude determination method E21 according to another embodiment of the present disclosure.
Figure 8:
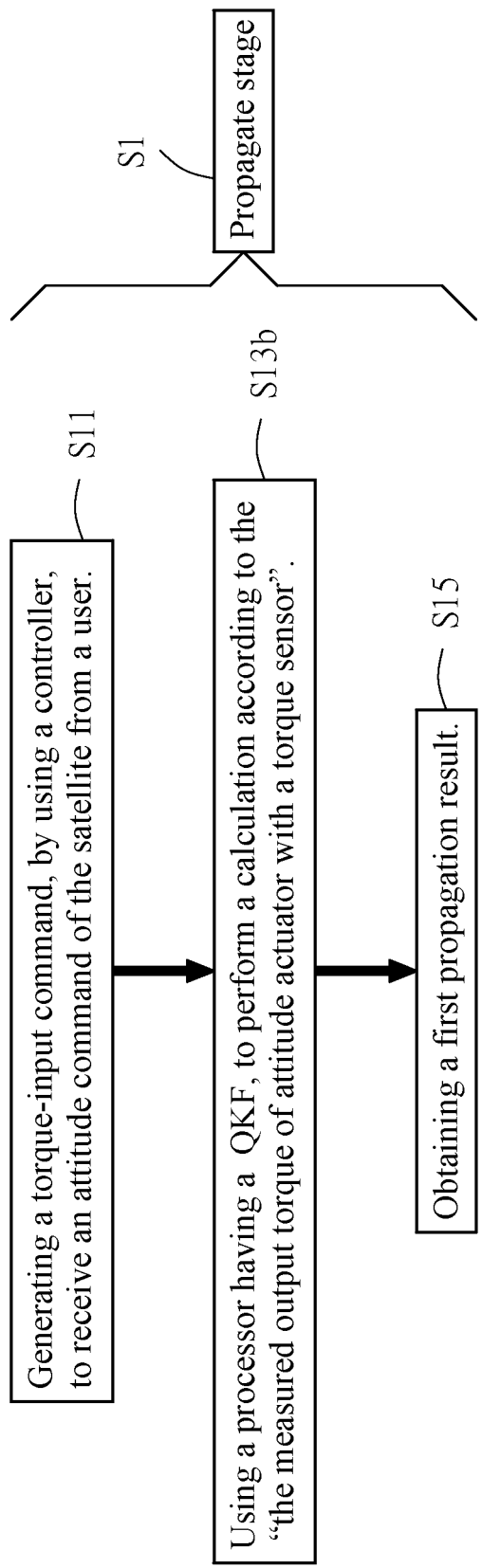
FIG. 8 illustrates a flowchart of the propagate stage in the satellite attitude determination method E22 according to another embodiment of the present disclosure.
Figure 9:
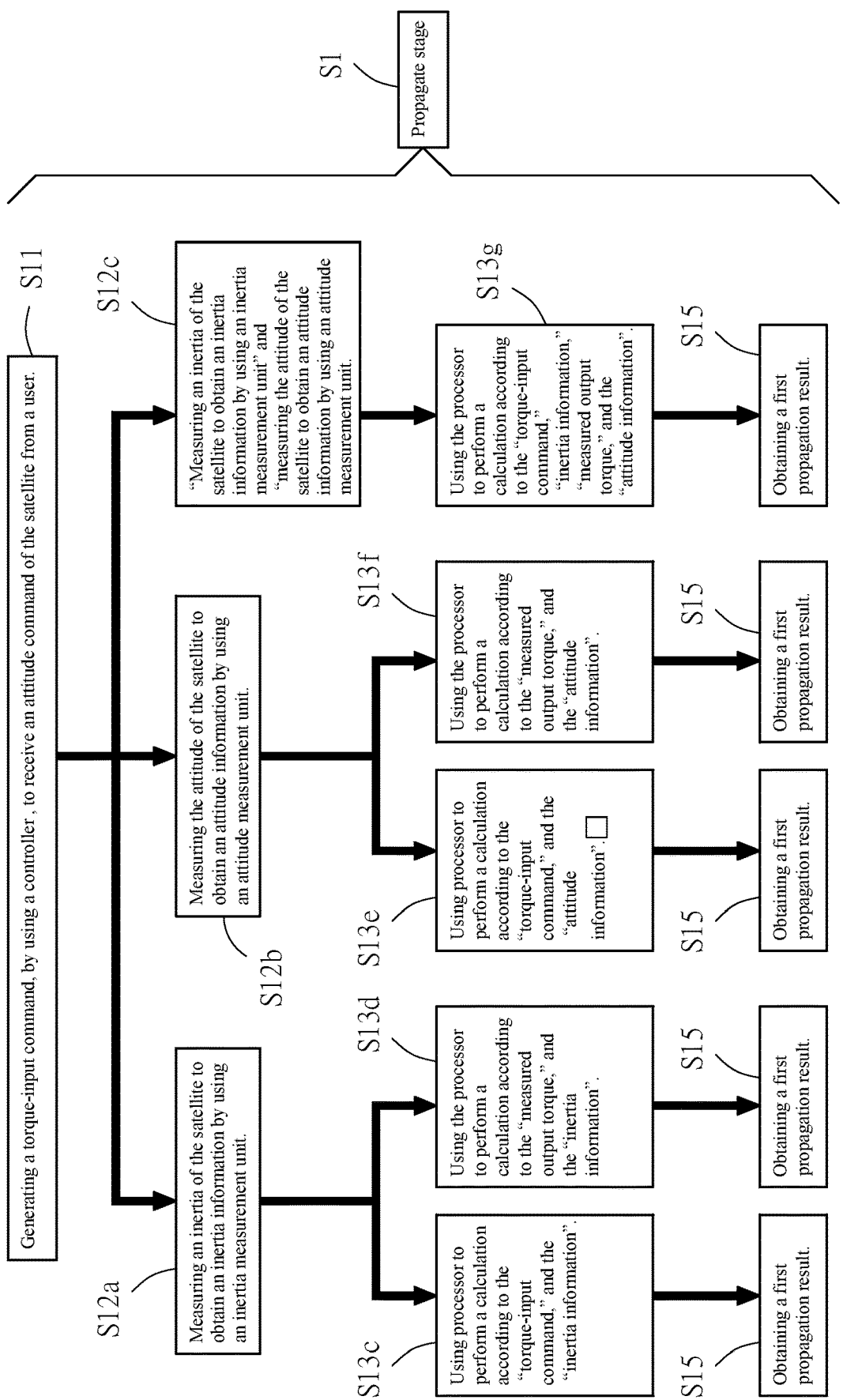
FIG. 9 illustrates a flowchart of the propagate stage in the satellite attitude determination methods E23-E27 according to one embodiment of the present disclosure.

From FIG. 6 to FIG. 9, the satellite attitude determination methods according to the present disclosure may be mainly divided into two types (six kinds in sum): FIG. 6 illustrates a first type of the satellite attitude determination method according to the present disclosure, which includes the satellite attitude determination methods E21 and E22, and the satellite attitude determination methods E21 and E22 are respectively described by the fourth practical embodiment and the fifth practical embodiment; on the other hand, FIG. 9 illustrates a second type of the satellite attitude determination method according to the present disclosure, which includes the satellite attitude determination methods E23 to E26, and the sixth practical embodiment describes the satellite attitude determination methods E23 to E26 to the ninth practical embodiment.

The difference between the second type and the first type is that the second type of the satellite attitude determination methods E23 to E26, as compared with the first type of the satellite attitude determination methods E21 and E22, further includes "measuring the inertia of the satellite to obtain an inertia information by using an inertia measurement unit 5" (step S12a) or "measuring the attitude of the satellite to obtain an attitude information by using an attitude measurement unit 6" (step S12b).

As mentioned above, the second type of satellite attitude determination method includes the satellite attitude determination methods E23 to E26. The difference between these satellite attitude determination methods E23 to E26 is that, in the propagate stage, according to which "parameters," the processor 4 having the QKF 41 performs the calculation to obtain the first propagation result (step S15). The "parameters" may be:

(1) "a torque-input command from a controller 1 in the very last time step," and the "inertia information" (e.g., step S13c); or (2) "a measured output torque by a torque sensor on attitude actuator 2," and the "inertia information" (e.g., step S13d); or (3) "a torque-input command from a controller 1 in the very last time step," and the "attitude information" (e.g., step S13e); or (4) "a measured output torque obtained by measuring an attitude actuator 2 with a torque sensor," and the "attitude information" (e.g., step S13f); or (5) the "torque-input command from controller 1 in the very last time step," the "measured output torque by a torque sensor on attitude actuator 2," the "inertia information," and the "attitude information" (e.g., step S13g).

The implementations of the "propagate stage S1" in the satellite attitude determination methods E21-E26 are sequentially described by the fourth practical embodiment to the ninth practical embodiment.

[Fourth practical embodiment]

FIG. 7 illustrates a flowchart of a propagates stage S1 in the satellite attitude determination method E21 according to another embodiment of the present disclosure. Another embodiment of the present disclosure provides a satellite attitude determination method based on the QKF for predicting the satellite's attitude. The method includes a propagate stage S1 and an update stage S2. The propagate stage S1 includes:

Step S11: generating a torque-input command, by using a controller 1, to receive an attitude command of the satellite from a user;

Step S13a: using a processor having a QKF to perform a calculation according to the "torque-input command received by the controller 1";

Step S15: obtaining a first propagation result.

[Fifth practical embodiment]

FIG. 8 illustrates a flowchart of a propagates stage S1 in the satellite attitude determination method E22 according to another embodiment of the present disclosure. Another embodiment of the present disclosure provides a satellite attitude determination method based on the QFK for predicting the satellite's attitude. The method includes a propagate stage S1 and an update stage S2. The propagate stage S1 includes:

Step S11: generating a torque-input command, by using a controller 1, to receive an attitude command of the satellite from a user;

Step S13b: using a processor having a QKF, to perform a calculation according to the "the measured output torque of attitude actuator 2 with a torque sensor";

Step S15: obtaining a first propagation result.

FIG. 9 illustrates a flowchart of a propagates stage S1 in the satellite attitude determination methods E23, E24, E25, E26 according to one embodiment of the present disclosure. As mentioned above, the differences between these satellite attitude determination methods E23 to E26 is that, in the propagate stage, according to which "parameters," the processor 4 having the QKF performs the calculation to obtain the first propagation result (step S15). The "parameters" may be:

(1) "a torque-input command from a controller 1 in the very last time step," and the "inertia information" (e.g., step S13c); or (2) "a measured output torque by a torque sensor on attitude actuator 2," and the "inertia information" (e.g., step S13d); or (3) "a torque-input command from a controller 1," and the "attitude information" (e.g., step S13e); or (4) "a measured output torque by a torque sensor on attitude actuator 2," and the "attitude information" (e.g., step S13f).

[Sixth practical embodiment]

Figure 10:
FIG. 10 illustrates a flowchart of the propagate stage in the satellite attitude determination method E23 according to one embodiment of the present disclosure.

FIG. 10 illustrates a flowchart of a propagates stage S1 in the satellite attitude determination method E23 according to one embodiment of the present disclosure. The propagate stage S1 in the satellite attitude determination method E23 further includes:

Step S11: generating a torque-input command, by using a controller 1, to receive an attitude command of the satellite from a user;

Step S12a: measuring an inertia of the satellite to obtain an inertia information by using an inertia measurement unit 5;

Step S13c: using processor 4 to perform a calculation according to the "torque-input command," and the "inertia information";

Step S15: obtaining a first propagation result.

[Seventh practical embodiment]

Figure 11:
FIG. 11 illustrates a flowchart of the propagate stage in the satellite attitude determination method E24 according to one embodiment of the present disclosure.

FIG. 11 illustrates a flowchart of a propagates stage S1 in the satellite attitude determination method E24 according to one embodiment of the present disclosure. The propagate stage S1 in the satellite attitude determination method E24 further includes:

Step S11: generating a torque-input command, by using a controller 1, to receive an attitude command of the satellite from a user; Step S12a: measuring an inertia of the satellite to obtain an inertia information by using an inertia measurement unit 5; Step S13d: using the processor 4 to perform a calculation according to the "measured output torque," and the "inertia information";

Step S15: obtaining a first propagation result.

[Eighth practical embodiment]

Figure 12:
FIG. 12 illustrates a flowchart of the propagate stage in the satellite attitude determination method E25 according to one embodiment of the present disclosure.

FIG. 12 illustrates a flowchart of a propagates stage Si in the satellite attitude determination method E25 according to one embodiment of the present disclosure. The propagate stage S1 in the satellite attitude determination method E25 further includes:

Step S11: generating a torque-input command, by using a controller 1, to receive an attitude command of the satellite from a user;

Step S12b: "measuring the attitude of the satellite to obtain an attitude information by using an attitude measurement unit 6";

Step S13e: using processor 4 to perform a calculation according to the "torque-input command," and the "attitude information";

Step S15: obtaining a first propagation result.

[Ninth practical embodiment]

Figure 13:
FIG. 13 illustrates a flowchart of the propagate stage in the satellite attitude determination method E26 according to one embodiment of the present disclosure.

FIG. 13 illustrates a flowchart of a propagates stage S1 in the satellite attitude determination method E26 according to one embodiment of the present disclosure. The propagate stage Si in the satellite attitude determination method E26 further includes:

Step S11: generating a torque-input command, by using a controller 1, to receive an attitude command of the satellite from a user;

Step S12b: "measuring the attitude of the satellite to obtain an attitude information by using an attitude measurement unit 6";

Step S13f: using the processor 4 to perform a calculation according to the "measured output torque," and the "attitude information";

Step S15: obtaining a first propagation result.

[Tenth practical embodiment]

Figure 14:
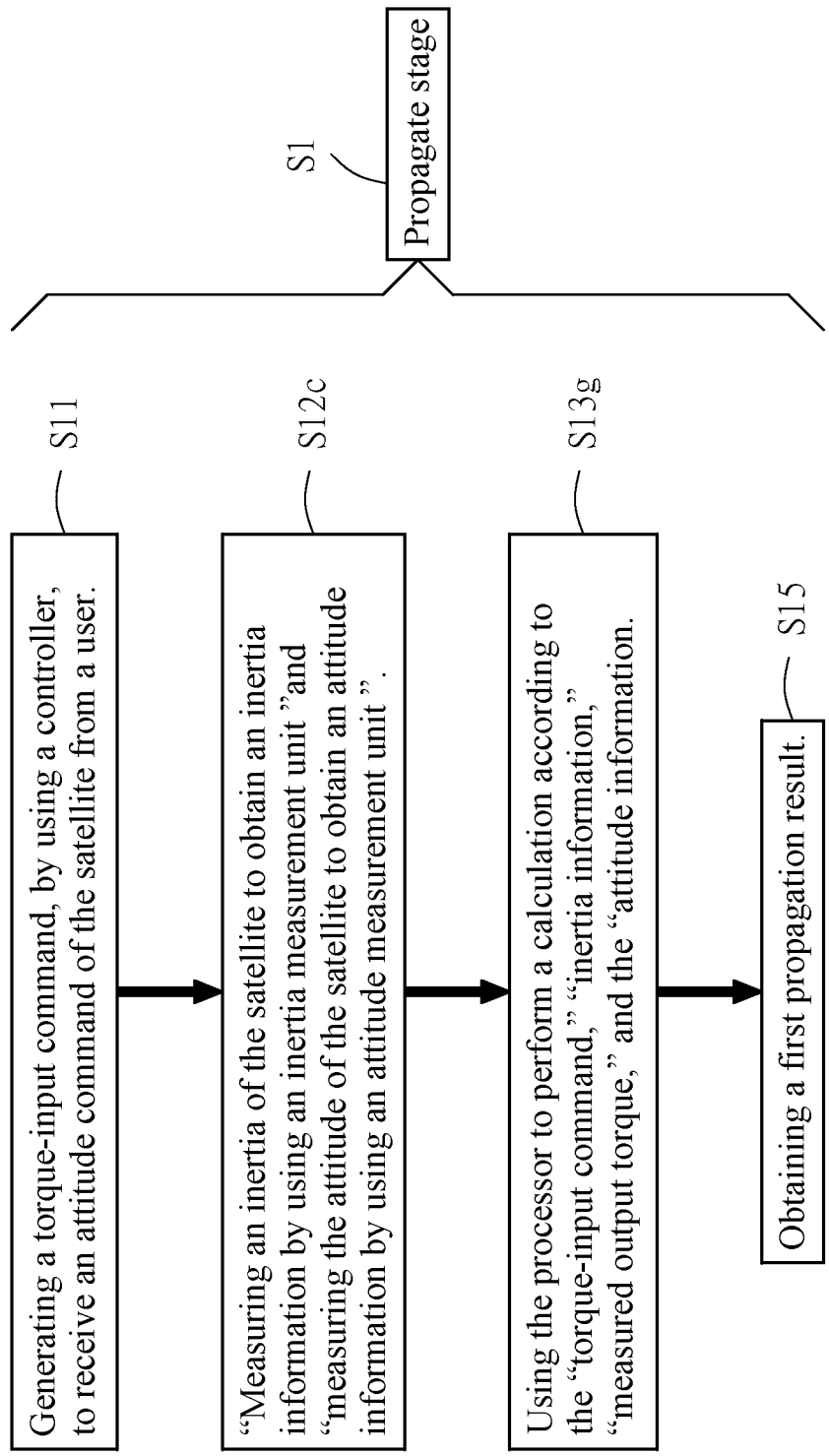
FIG. 14 illustrates a flowchart of the propagate stage in the satellite attitude determination method E27 according to one embodiment of the present disclosure.

FIG. 14 illustrates a flowchart of a propagates stage S1 in the satellite attitude determination method E27 according to one embodiment of the present disclosure. The propagate stage S1 in the satellite attitude determination method E27 further includes:

Step S11: generating a torque-input command, by using a controller 1, to receive an attitude command of the satellite from a user;

Step S12c: "measuring an inertia of the satellite to obtain an inertia information by using an inertia measurement unit 5" and "measuring the attitude of the satellite to obtain an attitude information by using an attitude measurement unit 6";

Step S13g: using the processor 4 to perform a calculation according to the "torque-input command," " inertia information," "measured output torque," and the "attitude information";

Step S15: obtaining a first propagation result.

[Eleventh practical embodiment]

Figure 15:
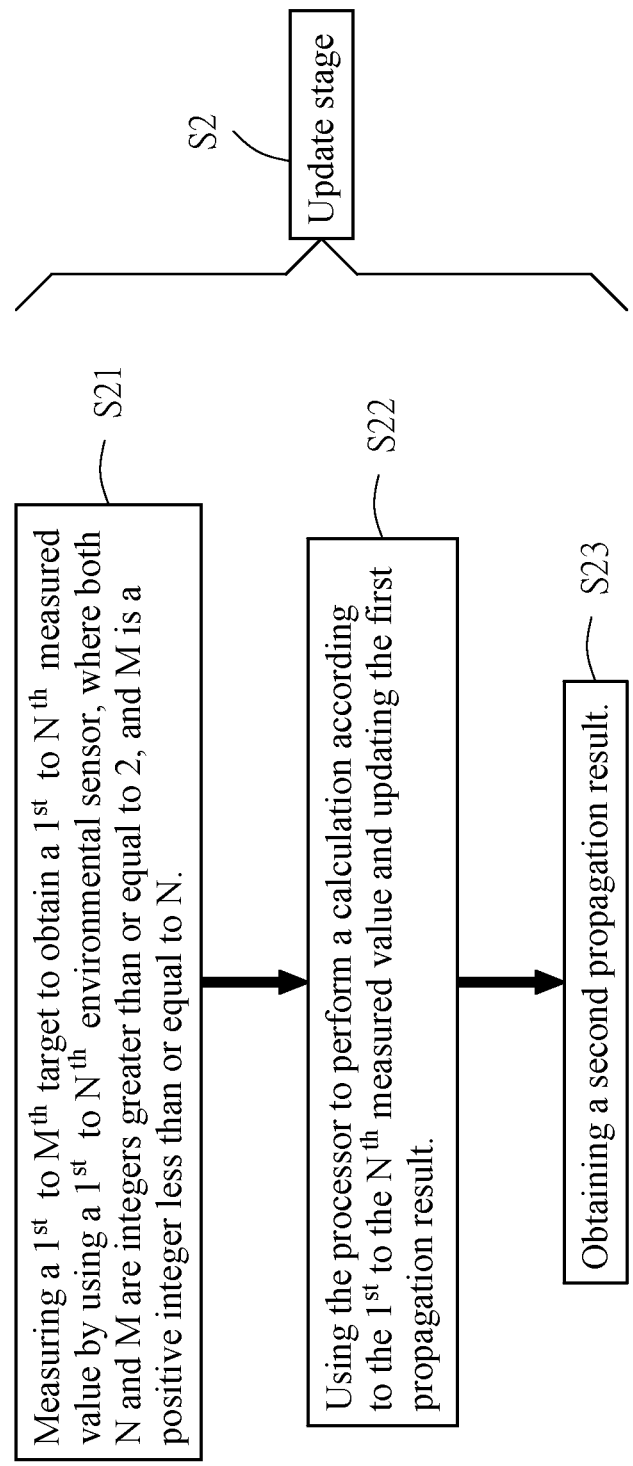
FIG. 15 illustrates a flowchart of an update stage in the satellite attitude determination methods E21-E27 according to one embodiment of the present disclosure.

FIG. 15 illustrates a flowchart of an update stage S2 in the satellite attitude determination methods E21-E26 according to one embodiment of the present disclosure. It should be noted that, though the steps of the propagate stages S1 in these satellite attitude determination method E21-E26 are different, these satellite attitude determination method E21-E26 have the same update stage S2 after obtaining the first propagation result, and the update stage includes:

Step S21: measuring a $1^{st}$ to $M^{th}$ target to obtain a $1^{st}$ to $N^{th}$ measured value by using a $1^{st}$ to $N^{th}$ environmental sensor, where both N and M are integers greater than or equal to 2, and M is a positive integer less than or equal to N;

Step S22: using the processor to perform a calculation according to the $1^{st}$ to the $N^{th}$ measured value and updating the first propagation result; and Step S23: obtaining a second propagation result.

[Twelfth practical embodiment]

Figure 16:
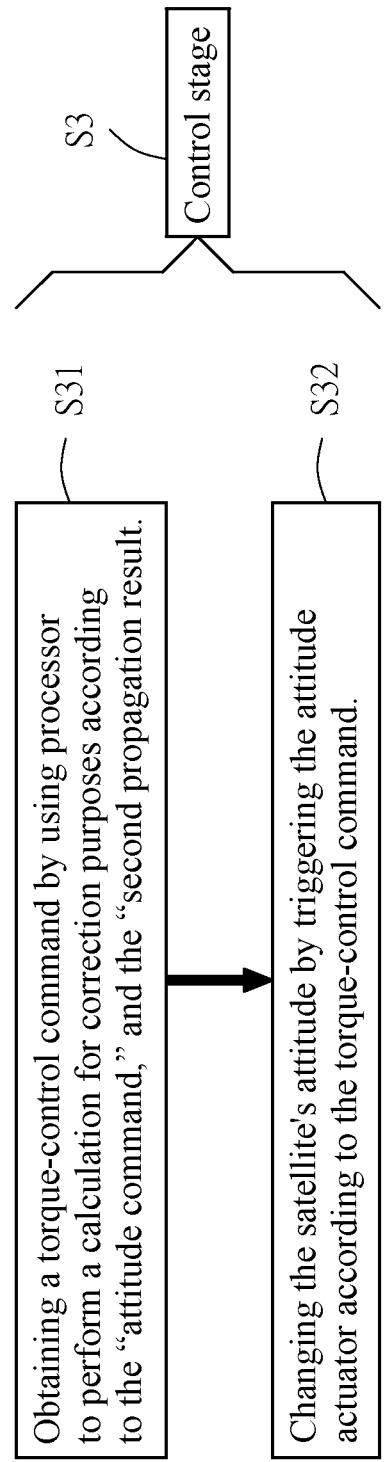
FIG. 16 illustrates a flowchart of a control stage in the satellite attitude control method E31 according to one embodiment of the present disclosure.

Please refer to FIG. 5 and FIG. 16 together. FIG. 16 illustrates a flowchart of a control stage S3 in a satellite attitude control method E31 according to one embodiment of the present disclosure. As mentioned above, as compared with the satellite attitude determination methods E21-E26 according to the present disclosure, the satellite attitude control method E31 according to the present disclosure merely further includes the "control stage S3". In other words, the satellite attitude control method includes any of the satellite attitude determination methods E21-E26, and the control stage S3 includes:

Step S31: obtaining a torque-control command by using processor 4 to perform a calculation for correction purposes according to the "attitude command," and the "second propagation result," and Step S32: changing the satellite's attitude by triggering the attitude actuator according to the torque-control command In brief, the satellite attitude control method E31 described in the foregoing paragraphs may be generally called "the satellite fine pointing mode." With the control-logic in a feedback-compensation manner (namely, the satellite attitude control method E31), the satellite attitude control system compares the "attitude command" from the user with the second attitude propagation result to obtain the torque control command for the attitude actuator. Consequently, the satellite's attitude may reach its "attitude command" one step closer.

Additionally, in some embodiments, the satellite attitude control method E31 includes at least three control modes. In addition to the foregoing satellite fine pointing mode, the satellite attitude control method E31 further includes a satellite de-tumbling mode (De-tumbling) and a satellite de-saturation mode (De-Saturation).

As mentioned above, the satellite attitude control system in which the indirect attitude actuator 2 is applied has the angular momentum saturation issue. Therefore, in some satellite attitude control systems, the attitude control method E31 further includes the satellite de-saturation mode (De-saturation).

Furthermore, the De-tumbling mode is an emergency mode triggered when (1) satellites just get ejected into space from the rocket or (2) the satellite is suffering from significant disturbance torque and entering a tumbling state. When the satellite detects this tumbling state happens, herein refers to the absolute body angular velocity of the satellite is faster than a preset value, the de-tumbling mode is triggered. Compared with the satellite attitude control method E31, only the direct attitude actuator 2 is used in the de-tumbling mode. It outputs torque to the satellite according to the torque-control command to reduce the tumbling speed of the satellite.

As above, according to one or some embodiments of the present disclosure, a satellite attitude control system based on the QKF and control method thereof are provided. By applying the QKF to the satellite attitude control system, the satellite attitude control system can achieve the effects of "expandable environmental sensors," "performs a calculation according to the information of 'different' environmental reference objects within the space measured by environmental sensors," and "performs at least one 'update procedure' to correct the propagation result" to the first propagation result. As a result, an "expandable attitude determination system" can be achieved.

Moreover, the present disclosure provides a satellite attitude control method in which various types and numbers of indirect attitude actuators (e.g., a spherical motor) and direct attitude actuators can be applied.

The above embodiments were chosen and described to explain the principles of the disclosure and their practical application to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An attitude determination and control system for controlling an attitude of a satellite, including:
a controller for receiving an attitude command from a user to generate a torque-input command for an attitude actuator and sending a torque-control command to the attitude actuator;
the attitude actuator for receiving the torque-control command and outputting a torque to change the attitude of the satellite, wherein the attitude actuator measures the output torque via sensors, and wherein the attitude actuator includes at least one indirect attitude actuator, and wherein the at least one indirect attitude actuator includes a spherical motor;
$1^{st}$ to $N^{th}$ environmental sensors for measuring $1^{st}$ to $M^{th}$ targets to simultaneously obtain $1^{st}$ to $N^{th}$ measured values of the 1 to N environmental sensors at time t, wherein both N and M are integers greater than or equal to 2, and M is a positive integer less than or equal to N; and
a processor having a Quaternion Kalman Filter (QKF), wherein the processor connects to the controller, the attitude actuator, and the $1^{st}$ to the $N^{th}$ environmental sensors,
wherein the processor is configured to
obtain a first propagation result at time t by performing a calculation according to at least one of the torque-input command from the controller and the measured output torque,
obtain a second propagation result by performing a calculation according to the $1^{st}$ to the $N^{th}$ measured values measured at time t and then updating the first propagation result, and
repeat the steps of obtaining the first propagation result and the second propagation result at time t+/, and updating the first propagation result at time t+1, wherein the steps of obtaining the first propagation result, updating the first propagation result, and obtaining the second propagation result are repeated no more than N times, wherein the processor is configured to detect and remove the measurement values of sensors that are not functioning properly so that the number of updating the first propagation result and obtaining the second propagation result is reduced to less than N times.

2. The attitude determination and control system according to claim 1, further comprising at least one of an inertia measurement unit and an attitude measurement unit, wherein the inertia measurement unit is for measuring an inertia status, and the attitude measurement unit is for directly measuring the attitude to obtain attitude information;
wherein in a condition that the satellite attitude control system includes the inertia measurement unit, the processor further connects to the inertia measurement unit, and the processor is configured to obtain the first propagation result by performing a calculation according to either one or both of the torque-input command from the controller and the measured output torque, and the inertia information;
wherein in a condition that the attitude control system includes the attitude measurement unit, the processor further connects to the attitude measurement unit, and the processor is configured to obtain the first propagation result by performing a calculation according to either one or both of the torque-input command from the controller and the measured of output torque, and the attitude information.

3. An attitude determination and control method for determining an attitude of a satellite, including:
a propagate stage including:
obtaining a first propagation result at time t, by using a processor having a Quaternion Kalman Filter (QKF), to perform a calculation according to at least one of a torque-input command from a controller and a measured output torque on an attitude actuator, wherein the attitude actuator comprises at least one indirect attitude actuator, and wherein the at least one indirect attitude actuator includes a spherical motor; and
an update stage including:
using $1^{st}$ to $N^{th}$ environmental sensors to simultaneously measure $1^{st}$ to $M^{th}$ targets at time t to obtain $1^{st}$ to $N^{th}$ measured values, wherein both N and M are integers greater than or equal to 2, and M is a positive integer less than or equal to N;
obtaining a second propagation result by using the processor to perform a calculation according to the $1^{st}$ to the $N^{th}$ measured values measured at time t, and then to update the first propagation result; and
repeating the steps of obtaining the first propagation result, updating the first propagation result, and obtaining the second propagation result at time t+1, wherein the steps of obtaining the first propagation result and the second propagation result and updating the first propagation result are repeated no more than N times, wherein the processor is configured to detect and remove the measurement values of sensors that are not functioning properly so that the number of updating the first propagation result and obtaining the second propagation result is reduced to less than N times.

4. The attitude determination and control method according to claim 3, wherein the propagate stage further includes at least one step of measuring inertia of the satellite to obtain inertia information by using an inertia measurement unit and measuring the attitude of the satellite to obtain an attitude information by using an attitude measurement unit;
wherein in a condition that the propagate stage further includes a step of measuring the inertia of the satellite to obtain the inertia information by using the inertia measurement unit, the processor is for obtaining the first propagation result by performing a calculation according to either one or both of the torque-input command from the controller, and the measured output torque, and the inertia information;
wherein in a condition that the propagate stage further includes a step of measuring the attitude of the satellite to obtain the attitude information by using the attitude measurement unit, the processor is for obtaining the first propagation result by performing a calculation according to either one or both of the torque-input command from the controller and the measured output torque, and the attitude information.

5. An attitude determination and control method for controlling an attitude of a satellite, including:
a propagate stage including:
receiving an attitude command from a user; and
obtaining a first propagation result at time t, by using a processor having a Quaternion Kalman Filter (QKF), to perform a calculation according to at least one of torque-input command from a controller and an measured output torque of an attitude actuator measured by a torque sensor, wherein the attitude actuator includes at least one indirect attitude actuator, and wherein the at least one indirect attitude actuator includes a spherical motor;
an update stage including:
using $1^{st}$ to $N^{th}$ environmental sensors to simultaneously measure $1^{st}$ to $M^{th}$ targets at time t and to obtain $1^{st}$ to $N^{th}$ measured values, wherein both N and M are integers greater than or equal to 2, and M is a positive integer less than or equal to N;
obtaining a second propagation result by using the processor to perform a calculation according to the $1^{st}$ to the $N^{th}$ measured values measured at time t, and then to update the first propagation result; and
repeating the steps of obtaining the first propagation result, updating the first propagation result, and obtaining the second propagation result at time t+1, wherein the steps of obtaining the first propagation result and the second propagation result and updating the first propagation result are repeated no more than N times, wherein the processor is configured to detect and remove the measurement values of sensors that are not functioning properly so that the number of updating the first propagation result and obtaining the second propagation result is reduced to less than N times; and a control stage, including:
obtaining a torque-control command by using the processor to perform a calculation for compensation purposes according to the attitude command and the second propagation result; and
altering the satellite's attitude using the attitude actuator to output a torque to the satellite according to the torque-control command.

6. The satellite attitude determination and control method according to claim 5, wherein the propagate stage further includes at least one of measuring inertia of the satellite to obtain inertia information by using an inertia measurement unit, and measuring the attitude of the satellite to obtain attitude information by using an attitude measurement unit;
wherein in a condition that the propagate stage further includes a step of measuring the inertia of the satellite to obtain the inertia information by using the inertia measurement unit,
wherein the processor is configured to obtain the first propagation result by performing a calculation according to one or both of the torque-input command from the controller and the measured output torque, and the inertia information;
wherein in a condition that the propagate stage further includes a step of measuring the attitude of the satellite to obtain the attitude information by using the attitude measurement unit, the processor is configured to obtain the first propagation result by performing a calculation according to one or both of the torque-input command from the controller and the measured value of output torque, and the attitude information.

7. The attitude control determination and control system according to claim 1, wherein the attitude actuator further includes at least one direct attitude actuator.

8. The attitude determination and control system according to claim 2, wherein the attitude actuator further includes at least one direct attitude actuator.

9. The attitude determination and control method according to claim 3, wherein the attitude actuator further includes at least one direct attitude actuator.

10. The attitude determination and control method according to claim 4, wherein the attitude actuator further includes at least one direct attitude actuator.

11. The attitude determination and control method according to claim 5, wherein the attitude actuator further includes at least one direct attitude actuator.

12. The attitude determination and control method according to claim 6, wherein the attitude actuator further includes at least one direct attitude actuator.

13. The attitude determination and control system according to claim 1, wherein the controller of the control system has at least three control modes: a de-tumbling mode, a de-saturation mode, and a fine-pointing mode.

14. The attitude determination and control system according to claims 2, wherein the controller of the control system has at least three control modes: a de-tumbling mode, a de-saturation mode, and a fine-pointing mode.

15. The attitude determination and control method according to claim 3, wherein the indirect attitude actuator further includes at least one or more of the single-gimbal control moment gyro, the dual-gimbal control moment gyro, and the reaction wheel, and wherein the controller of the control system has at least three control modes: a de-tumbling mode, a de-saturation mode, and a fine-pointing mode.

16. The attitude determination and control method according to claim 4, wherein the indirect attitude actuator further includes at least one or more of the single-gimbal control moment gyro, the dual-gimbal control moment gyro, and the reaction wheel, and wherein the controller of the control system has at least three control modes: a de-tumbling mode, a de-saturation mode, and a fine-pointing mode.

17. The attitude determination and control method according to claim 5, wherein the indirect attitude actuator further includes at least one or more of the single-gimbal control moment gyro, the dual-gimbal control moment gyro, and the reaction wheel, and wherein the controller of the control system has at least three control modes: a de-tumbling mode, a de-saturation mode, and a fine-pointing mode.

18. The attitude determination and control method according to claim 6, wherein the indirect attitude actuator further includes at least one or more of the single-gimbal control moment gyro, the dual-gimbal control moment gyro, and the reaction wheel, and wherein the controller of the control system has at least three control modes: a de-tumbling mode, a de-saturation mode, and a fine-pointing mode.

* * * * *